(12) United States Patent
Nitschke

(10) Patent No.: US 7,845,406 B2
(45) Date of Patent: Dec. 7, 2010

(54) ENHANCED OIL RECOVERY SYSTEM FOR USE WITH A GEOPRESSURED-GEOTHERMAL CONVERSION SYSTEM

(76) Inventor: George Nitschke, 15 Andrew Dr., New Ipswich, NH (US) 03071

( * ) Notice: Subject to any disclaimer, the term of this patent is extended or adjusted under 35 U.S.C. 154(b) by 236 days.

(21) Appl. No.: 11/897,334

(22) Filed: Aug. 30, 2007

(65) Prior Publication Data

US 2009/0056944 A1 Mar. 5, 2009

(51) Int. Cl.
*E21B 43/24* (2006.01)
*E21B 43/40* (2006.01)
(52) U.S. Cl. ............ 166/266; 60/641.2; 166/267; 166/272.3; 166/303; 405/129.35
(58) Field of Classification Search ........... 60/641.2, 60/641.5; 165/65; 166/75.12, 266, 267, 166/272.3, 272.6, 302, 303, 369; 405/129.35; 588/250
See application file for complete search history.

(56) References Cited

U.S. PATENT DOCUMENTS

| | | | | |
|---|---|---|---|---|
| 3,258,069 A * | 6/1966 | Hottman | ............ | 166/252.1 |
| 3,679,264 A * | 7/1972 | Van Huisen | ............ | 299/4 |
| 3,827,243 A * | 8/1974 | Paull et al. | ............ | 60/641.2 |
| 4,078,608 A * | 3/1978 | Allen et al. | ............ | 166/266 |
| 4,273,189 A * | 6/1981 | Carpenter | ............ | 166/266 |
| 4,319,635 A * | 3/1982 | Jones | ............ | 166/401 |
| 4,530,211 A * | 7/1985 | Spevack | ............ | 60/641.5 |
| 4,741,398 A * | 5/1988 | Goldsberry | ............ | 166/266 |
| 4,824,447 A * | 4/1989 | Goldsberry | ............ | 96/9 |
| 5,442,906 A * | 8/1995 | Broadus | ............ | 60/39.182 |
| RE36,282 E * | 8/1999 | Nitschke | ............ | 60/641.2 |
| 7,150,320 B2 * | 12/2006 | Heins | ............ | 166/266 |
| 2005/0022989 A1* | 2/2005 | Heins | ............ | 166/272.3 |
| 2009/0107111 A1* | 4/2009 | Oliver | ............ | 60/274 |

* cited by examiner

*Primary Examiner*—George Suchfield
(74) *Attorney, Agent, or Firm*—Lambert & Associates; Adam J. Bruno; Gary E. Lambert

(57) ABSTRACT

A system and series of methods, which utilize Geopressured-Geothermal (GPGT) energy for the enhanced recovery of formation crude oil. The system is designed to interface with a conversion system which concentrates the GPGT brine while recovering H2O distillate and gas, e.g., as taught by Nitschke in U.S. Pat. Re. 36,282. The system promotes enhanced oil recovery (EOR) from an oil formation via steamflood and optional gas injection, powered by the GPGT gas and using the recovered H2O distillate for source water. The system optionally reuses the bulk of the injected EOR fluids via thermal regeneration and volume replenishing, alleviating disposal costs and environmental stresses. The system manages the concentrated GPGT brine byproduct by optionally producing solid salt for sale, flowing to an appropriate end-user, or disposing in a suitable subterranean formation.

9 Claims, 10 Drawing Sheets

| Units | | Design | | Ambient | | Solution | |
|---|---|---|---|---|---|---|---|
| m | lbm/s | sn | 0.0% | Ta | 70 | msurf uncorr | 0.04 |
| T | F | ky | 5184 | RH | 30% | mer uncorr | 1.01 |
| P | psia | N | 44 | W | 5 | meb uncorr | 0.01 |
| h | BTU/lbm | A pond | 0.1 | Qsol | 300 | Q net rad | 249 |
| ky | lbm/(hr*N*ΔH) | N/1000 ft^2 | 10 | Pa | 0.105 | Q conv | 5 |
| A | acres | Cw | 1 | Pp | 0.268 | dH/dx correction | 0.939 |
| Q | W/m^2 | gpm/N | 8.0 | Pr | 0.487 | me corrected | 0.99 |
| W | mph | P | 14.7 | Pb | 0.937 | me - mb | -0.01 |
| ρ | lbm/ft^3 | spray ht ft | 15 | ρa | 0.075 | LHS - RHS | 1 |

| Tr | 80.0 | Tsp | 69.5 |
|---|---|---|---|
| | | Tb | 100 |
| | | Tp | 61.77 |

| mb | 1 |
|---|---|
| Tb | 100 |
| Pb | 30 |
| hb | 68 |

| rate | 348 | ms | 0.875 |
|---|---|---|---|
| Pn | 9.0 | Ts | 152 |
| kW | 5 | hfgs | 1005 |
| ρr | 62.2 | Cpb | 1.000 |

| ΔTlm | 80.8 |
|---|---|
| Ac | 157 |

FIGURE 13

Table I: Characteristics of the Fluid Conditioning System (FCS) Modes

| Mode No. | Solid Salt or Sat.Brine | Recirculate TEOR Fluid? | Power Cycle | TEOR or Sell Gas/H2O |
|---|---|---|---|---|
| 1 | Solid | N | None, SEP only | TEOR |
| 2 | Solid | Y | None, SEP only | TEOR |
| 3 | Sat.Brine | Variable | Brayton-Rankine (high power) | TEOR |
| 4 | Sat.Brine | Variable | Brayton-only (high heat) | TEOR |
| 5 | Sat.Brine | Variable | None, SEP only | TEOR |
| 6 | Sat.Brine | NA | None, SEP only | Gas/H2O |
| 7 | Solid | NA | None, SEP only | Gas/H2O |

FIGURE 14

Table II: FCS TEOR Mode 1 Performance Projections

| FCS TEOR Mode 1 System Performance GPGT Well Case: 20k bpd, 7% salt by wt., 300F, 60 scf/bbl GWR ||||||| 
|---|---|---|---|---|---|---|
| From | To | Fluid | W (lbm/s) | P (psia) | T (F) | Other |
| GPGT Well | Sep-Turbine | brine | 81.6 | 7500 | 300 | $Z_{SALT}$=0.043; $Z_{H2O}$=0.949 |
| Sep-Turbine | TEOR FCS | gas | 0.729 | 200 | 300 | |
| Sep-Turbine | Pre-Heater | gas | 0 | | | |
| Sep-Turbine | out | NA | | | | SHP=847 (600 kW @ 95%) |
| Pre-Heater | MED | brine | 80.76 | 200 | 300 | |
| MED | TEOR FCS | H2O | 51.02 | | | P(hi) and Tmix calculated |
| MED | TEOR FCS | steam | 8.87 | 3.94 | 152.2 | TS=(TN - BPR) |
| MED | SEP | brine | 20.84 | 3.94 | 164.5 | |
| MED | Pipeline | brine | | | | solid salt production |
| MED | out | vent gas | 0.044 | 18.52 | | mixture temperature |
| Condenser | SEP | steam | 12.2 | 3.94 | 152.2 | full-flash from MED Manifold |
| SEP | out | NA | | | | 245 tons/day |
| SEP | Pipeline | brine | | | | solid salt production |
| TEOR FCS | out | NA | | | | 408 kgal/day H2O Distillate |
| TEOR FCS | SEP | recirc EOR | | | | solid salt production |
| TEOR FCS | Condenser | steam | | | | no power cycle |
| TEOR FCS | TEOR | steamflood | 20.71 | 200 | 382 | X=0.40 |
| TEOR FCS | out | NA | | | | power, sale gas |
| TEOR | out | oil | | | | bpd=1000 |
| Sum Pwr | NA | NA | | | | 467 kW (site: 51+51+31) |
| Pipeline | out | NA | | | | pwr/well, cost |
| Pipeline | Solar Pond | brine | | | | |
| Solar Pond | ROD | NA | | | | power |
| ROD | out | Potable | | | | TAF/y |
| Notes: | 20 lbm/s approximately 5000 bpd Sum Power: [Pelton Pwr] - [Site Requirements] + [Auxiliary Pwr] - [Pipeline Requirements] ||||||

FIGURE 15

Table III: FCS TEOR Mode 4 Performance Projections

| FCS TEOR Mode 4 System Performance<br>GPGT Well Case: 20k bpd, 7% salt by wt., 300F, 60 scf/bbl GWR ||||||||
|---|---|---|---|---|---|---|---|
| From | To | Fluid | W (lbm/s) | P (psia) | T (F) | Other ||
| GPGT Well | Sep-Turbine | brine | 81.6 | 7500 | 300 | $Z_{SALT}$=0.043; $Z_{H2O}$=0.949 ||
| Sep-Turbine | TEOR FCS | gas | 0.729 | 200 | 300 | ||
| Sep-Turbine | Pre-Heater | gas | 0 | | | ||
| Sep-Turbine | out | NA | | | | SHP=847 (600 kW @ 95%) ||
| Pre-Heater | MED | brine | 80.76 | 200 | 300 | ||
| MED | TEOR FCS | H2O | 51.02 | | | P(hi) and Tmix calculated ||
| MED | TEOR FCS | steam | 8.87 | 3.94 | 152.2 | TS=(TN - BPR) ||
| MED | SEP | brine | 0 | | | ||
| MED | Pipeline | brine | 20.84 | 51 | 164.5 | $\Delta$P from Pump Talley Pwr ||
| MED | out | vent gas | 0.044 | 18.52 | | mixture temperature ||
| Condenser | SEP | steam | 0.875 | 3.94 | 152.2 | V-Comp by-pass ||
| SEP | out | NA | | | | Zero-Discharge ||
| SEP | Pipeline | brine | | | | Zero-Discharge ||
| TEOR FCS | out | NA | | | | 208 kgal/d, 6614 bpd irrig.wat. ||
| TEOR FCS | SEP | recirc EOR | 1 | 30 | 100 | condense bypassed steam ||
| TEOR FCS | Condenser | steam | 0.875 | 3.94 | 152.2 | pass-thru to Condenser ||
| TEOR FCS | TEOR | steamflood | 40 | 200 | 382 | X=0.388 ||
| TEOR FCS | out | NA | | | | power, sale gas ||
| TEOR | out | oil | | | | bpd=2000 ||
| site | NA | NA | | | | 463 kW (site: 21+5+31+80) ||
| Pipeline | out | NA | | | | 80 kW pwr, $7.1M Capital ||
| Pipeline | Solar Pond | brine | 20.84 | | | ||
| Solar Pond | ROD | NA | | | | 5.35 Watts/sq.meter ||
| ROD | out | Potable | | | | 7.5 TAF/y ||
| Notes: | 20 lbm/s approximately 5000 bpd<br>Sum Power: [Pelton Pwr] - [Site Requirements] + [Auxiliary Pwr] - [Pipeline Requirements] |||||||

FIGURE 16

Table IV: FCS Modes Comparative Notes

| Mode | $m_{TEOR_{X-best}}$ pps | Key Attributes | Characterizing Equipage |
|---|---|---|---|
| 1 | 20.7 | solid salt production | 2.0 acre SEP (51 kW draw) |
| 2 | 20.4 | solid salt production w/ recirc | 2.0 acre SEP, 6000 sf Regen HX |
| 3 | 29.8 | SP build, high-power mode | 0.4 acre SEP, CC-Pwr, VC, AG |
| 4 | 39.2 | SP build, high-heat mode | 0.1 acre SEP, BC-Pwr, VC, AG |
| 5 | 20.9 | SP build, simple TEOR | 0.7 acre SEP, Boiler |
| 6 | NA | SP build, sell gas | 0.5 acre SEP (38 kW draw) [1] |
| 7 | NA | Solid salt production, sell gas | 2.0 acre SEP (51 kW draw) |

- All cases $P_{EOR}$ = 200 psia, $T_{EOR}$ = 382°F for baseline conditions (20k bpd, 7%, 300F, 60GWR)
- "$X_{best}$" injected steam-flood quality = 0.40 (Note: 20 pps ≅ 5000 bpd)
- CC-Pwr = Combined-Cycle (Brayton-Rankine) power generation
- VC = End-Effect Vapor Compressor
- AG = Auxiliary Generator
- BC-Pwr = Brayton Cycle power generation only
- SEP sizing for general comparison only

[1] MED exit sat = 0.6, $m_{bN}$=35.65, $m_{vN}$=8.82, $m_{evap-loss}$=14.8 for $m_{w-net}$=45.1 ("m" units: pps)

FIGURE 17

Table V: FCS TEOR Performance Projections Per Gomaa's Method

| $\dot{m}_{TEOR_{X=best}}$ pps | 5 yr Project Life bpd (SOR=5.2) | 7 yr Project Life bpd (SOR=7.0) |
|---|---|---|
| 20 (Modes 1,2,5) | 1000 | 750 |
| 30 (Mode 3) | 1500 | 1125 |
| 40 (Mode 4) | 2000 | 1500 |

Note: Baseline GPGT: 20k bpd, 7% salt, 300F, 60 scf/bbl GWR

FIGURE 18

Table VI: Performance Comparison for Varying FCS TEOR Design Points

| Case: 20k bpd, 3.5% salt, 350F, 60 scf/bbl GWR | Design Pt Used For Gomaa | Kern Operator Design Pt |
|---|---|---|
| Steam Pressure (psia) | 200 | 600 |
| Steam Quality | 0.40 | 0.65 |
| Steam-Oil Ratio | 4.89 | 2.25 |
| Steam rate pps (mode 1) | 23.12 | 15.3 |
| Bpd (mode 1) | 1168 | 1679 |
| Steam rate pps (mode 4) | 45.3 | 26.4 |
| Bpd (mode 4) | 2252 | 2897 |

ENHANCED OIL RECOVERY SYSTEM FOR USE WITH A GEOPRESSURED-GEOTHERMAL CONVERSION SYSTEM

TECHNICAL FIELD OF THE INVENTION

The primary field of this invention encompasses systems design for enhanced recovery of crude oil from subterranean, oil bearing formations. More specifically, this invention involves applying Geopressured-Geothermal energy and resources for promoting enhanced oil recovery using a unique combination of systems. This invention employs a method of steam and hot water flooding, potentially with gas injection, to enhance the recovery of oil. Conversely, the invention would be likewise suitable for a number of steam-consumptive processes, like enhanced oil recovery.

A secondary field of this invention pertains to the management of produced Geopressured-Geothermal salt brine, once the brine has been concentrated via a distillation system. The method of this portion of the invention manages this end-brine by either routing the end-brine directly to a consumptive user (e.g., solar pond construction), employing spray evaporation ponds to reduce the brine to solid salt for sale, or disposing the concentrated end-brine in a suitable subterranean formation.

BACKGROUND OF INVENTION

Thermal enhanced oil recovery (TEOR) is an established practice known in the applicable art. TEOR is a subset of the general field of enhanced oil recovery (EOR), which also includes gas injection and oil formation flooding with non-heated water. In practice, TEOR includes steam injection and hot water flood. The TEOR practice is generally employed in heavy oil regions, where the in-place oil's viscosity is too high to be efficiently recovered by pumping or other EOR practices. In TEOR, steam (or hot water) is injected into the oil formation through an injection well. The injected steam transfers heat to the oil and promotes TEOR through a number of processes: heating the oil lowers its viscosity, improving its mobility; thermal expansion; steam distillation; and miscible processes. The oil is then recovered by hydrodynamic action with the injected fluid via flood-through or flow-back action.

Flood-through is used when the formation fluids are recovered at a production well other than the injection well. Flow-back is used when the injection well and the production well are the same, e.g., "huff and puff" steam injection, where steam is injected into the oil formation, allowed time to condense and heat the formation oil, and then recovered as liquid by back-flowing the injection well. In either case the basic principle is to inject hot fluid into an oil formation, promoting TEOR, and then recover that oil with the recovered injection fluids. The conventional practice for supplying the heat energy for TEOR steam flooding is typically accomplished by burning gas or oil, or in some cases in a cogeneration fashion, i.e., using the heat rejected from a power plant. In certain areas, TEOR practices include discarding the produced fluids, less the separated oil and gas, in subterranean formations.

The invention disclosed herein provides the heat for TEOR from Geopressured-Geothermal energy. Geopressured-Geothermal (GPGT) energies are contained in the reservoir brines of certain sedimentary basins, unlike Geothermal energies which are associated with volcanic hot-rock. The GPGT reservoir brines are highly pressured and hot, with values ranging 1000 to 4000 psi flowing surface pressure and 250 to 500° F. respectively. The brines are entrained with natural gas, varying 20 to 100 scf/bbl. The brines can be recovered via typical well-bores, at high flow rates ranging 15,000 to 40,000 bbl/day. The available energies are: (1) the mechanical energy of the high pressure flowing brine; (2) the thermal energy via heat exchange with the hot brine; and (3) the chemical energy of the natural gas which can be withdrawn from the brine in a standard gas separator. The GPGT brines' water and salts are additional resources. The amount of salts and minerals dissolved in the GPGT reservoir brines, or Total Dissolved Solids (TDS), varies over a wide range: 3500 to 200,000 mg/l. The TDS are comprised of mostly Sodium Chloride, with lesser amounts of Calcium, Potassium, and other trace elements.

Generally there is an inverse relationship between brine TDS and brine gas content as the solubility of gas in water decreases with increasing salinity. There are at least seven known GPGT basins in the U.S. and about 60 others worldwide (Dorfman, 1988). The largest U.S. GPGT basin is in the Gulf Coast region with the second largest in the Central Valley of California. The U.S. Department of Energy (DOE) initiated the Geopressured-Geothermal Research Program in 1974 to define the magnitude and recoverability of GPGT energy in the U.S. Under this program, five deep GPGT research wells were flow tested in the Texas-Louisiana Gulf Coast region from 1979 to 1992. These flow tests demonstrated GPGT reservoir production longevity, ranging 5 to 7 years at sustained flow rates of 20,000 to 40,000 bpd (Negus-de Wys, et al, 1990; Riney, 1991; Riney, 1993). The specifics of the GPGT reservoir drive mechanism(s) have been debated (e.g., fault-enhanced fluid communication, shale dewatering, etc.) but it's widely accepted that the GPGT basins have outperformed conventional reservoir models (Ramsthaler, et al, 1988; Riney, 1988; John, 1989). The DOE ended funding for the GPGT program in 1992 and the last of the DOE test wells was plugged in December, 1993 (Rinehart, 1994).

California and Texas contain 32% and 31% respectively of the nation's 1108 heavy oil reservoirs ($10<API°<20$). The Kern County, Calif. region alone is estimated to have 18 billion bbls heavy oil (Negus de-Wys, et al, 1991). In Texas, the Jackson-Yegua Barrier/Strandplain Sandstone is estimated to have 1.13 billion bbl original in-place oil (OOIP), of which 249 million bbls is considered recoverable (Seni, et al, 1993). Typical recovery efficiencies for unassisted medium-heavy oil in Texas range from 10% to 30% (Kimmell, 1991). Consequently, most of the in-place heavy oil remains a target of opportunity for TEOR. Likewise clean air requirements (typically 1 bbl oil-burn required for 3-4 bbl recovered oil; CA no longer allows oil-fired TEOR due to air quality) and recovery costs (e.g., $13/bbl for Kern County TEOR, c.1996 costs per EPRI, 1999) serve to impede conventional access to heavy oil reserves in the U.S.

This information is noted here to the greatest import to underscore the potential, and national importance, of the invention's TEOR method proposed herein; improved access to existing domestic reserves will have the same near-term effect of reducing our reliance on foreign oil. Additionally, the method proposed herein, as it interfaces with U.S. Pat. Re. 36,282 (Nitschke, 1999), provides for the efficient management of the GPGT brine end-salt, the lack of which management function(s) would inhibit full recovery of the GPGT potential.

Alameddine, in U.S. Pat. No. 4,986,352 (1991), teaches a method for intermittent steam injection which improves the vertical sweep efficiency for multi-layered oil sands. Alameddine reports model simulations showing steam/oil ratios improving from 4.6 bbls steam required per bbl oil recovered to only 2.7 bbls steam required per bbl of oil.

Goldsberry, in U.S. Pat. No. 4,824,447 (1989) teaches recovering GPGT brine from a wellbore for direct injection into oil reservoirs after it has been degassed in a high pressure separator, or combined with treated (surfactant/polymer) brine from a low pressure separator and then injected. The injection brine can also be treated with CO2 rich gas, which has been separated from the brine via a high-pressure membrane or low pressure separator. Part or all of the GPGT brine can be diverted to a turbine to produce electricity. The post turbine brine is then degassed in a high-pressure gas separator and then transfers heat to an organic Rankine cycle (ORC) for further power production. The thermally spent brine from the ORC is passed to a low-pressure gas separator, where CO2 rich gas is withdrawn. The high pressure separator gas is routed to a membrane where quality gas is removed for sale and CO2 rich gas is sent to combine with the low pressure separator gas for burn in an engine to drive a generator. The exhaust gas from the engine transfers superheat to the ORC. All spent brine is discarded to a disposal well in a suitable aquifer.

Jones, in U.S. Pat. No. 4,319,635 (1982) teaches that recovered brines can be processed, much in the same way as suggested by Goldsberry, and used directly for TEOR injection fluid. Jones further teaches that the gas separated from the brine can be used to heat the same brine prior to injection, or injected with the TEOR fluid and recovered after the TEOR operation is complete. He further teaches that raising the pore fluid pressure via injection of EOR and TEOR fluids increases porosity and permeability by mechanically expanding the pores. As in Goldsberry, Jones discards all the return TEOR blowdown to a disposal well in a suitable aquifer. Additionally, Jones teaches using straddle packers in the injection well to direct the injection fluid to higher and lower perforations across the oil formation as desired.

Marberry and Coutret, in U.S. Pat. No. 3,572,4375 (1971) teach stepwise steam injection into an injection well(s) across an oil formation with recovery in a production well(s). The steam injection is stepwise in the sense that [1] the steam is injected; [2] followed by hot water at the same temperature as the steam; and [3] lastly it's displaced to the production well(s) via cold water flood. Marberry and Coutret note that the available waters for steam flood in the oil field typically limit the injection steam's quality to 80% so as to prevent deposition of solids in the boiler equipment.

Walter, in U.S. Pat. No. 2,823,752 (1958), teaches a method for injecting steam and combustion gases for TEOR. Walter's method utilizes an internal combustion engine mounted on a common shaft with a turbine for injecting the TEOR fluid, compressors for pressurizing air and gas into a combustion chamber mounted on the surface, and a pump to feed water into the combustion chamber, where it is generated into steam for injection via the turbine. The method further utilizes the waste heat from the internal combustion engine, i.e., that to heat extracted to cool the engine as well as the sensible heat from the exhaust gas.

Schlinger, in U.S. Pat. No. 4,007,786 (1977), teaches the conventional practice for TEOR of steam production from a co-generation operation (shaft power for electricity with waste heat used for steam production), with particular focus on treating the gaseous fuel from a hydrocarbonaceous feedstock, preferably provided by the produced oil, to limit stack pollutants.

The methods taught by Clark (U.S. Pat. No. 4,458,756; 1984), Fleming (U.S. Pat. No. 4,699,213; 1987), and Horton, et al (U.S. Pat. No. 5,458,193; 1995), refer to the so called in-situ combustion methods, wherein a fuel supply and oxidation means are injected downhole into the oil bearing formation (or below in an adjacent formation per Clark) and ignited, by direct action or spontaneously. Water is typically injected downhole as feedstock for steamflood, the heat of which steam generation is provided by the downhole combustion.

Kobro, in U.S. Pat. No. 6,205,289 (2001) teaches a steam generation method for TEOR that uses a system of distributed electric boilers. Kobro notes the method will incur less thermal loss from that of conveying steam from a centralized generator, and that environmental issues regarding the emissions from in-field fuel burn will be largely circumvented.

Heins, in U.S. Pat. No. 7,150,320 (2006) teaches a method(s) for treating recovered TEOR fluid water for reuse in a boiler to generate TEOR steamflood. In his method(s), Heins aims to minimize the amount of blowdown (disposed), reduce the required processes for pre-treating TEOR boiler water, and improve water purity for boiler functioning.

Much of the work by the DOE's GPGT Industrial Consortium participants involved using GPGT brines for TEOR (Negus-de Wys, et al, 1991; Seni, et al, 1991, 1993; Hamlin, et al, 1991; and Kimmell, 1991), namely via direct flooding with the hot GPGT brine. In regard to the primary technical field of the instant invention, the TEOR method proposed herein is distinguished from that earlier work, as well as from conventional TEOR practice, in that it: (1) uses the gas produced from the GPGT brine to fire a power cycle to compresses low pressure steam for TEOR (e.g., Multi-Effect Distillation end-effect steam from a GPGT conversion system); (2) can reuse the TEOR fluid after separating the oil, versus disposal; (3) initiates and replenishes the TEOR fluid volume with steamflood rather than the GPGT brine itself; and (4) optionally uses the gas for TEOR process heat after being passed once through the oil reservoir under recovery and recovered at the oil separator, further enhancing oil recovery. Also the rate of TEOR fluid injection for the disclosed invention is more independent from the GPGT production rate than the direct brine-flood method. As the amount of recovered oil is directly related to the injection rate, this feature will allow for adjustments to site-specific factors and enable better control of the TEOR process while affording similar systems flexibility to the GPGT recovery and conversion systems (i.e., per Nitschke, U.S. Pat. Re. 36,282). These differences are key in cutting costs (disposal of TEOR fluids, pure water for steam generation) and operational difficulties (oil reservoir plugging by GPGT brine solids), in addition to improving the recovery efficiency via steamflood, versus brine flood, and gas entrainment. For comparison, Negus de-Wys, et al (1991) use a GPGT hot brine flood TEOR ratio of 20:1, i.e., 20 bbls hot brine flood to 1 bbl recovered heavy oil; the method discussed herein shows the potential to increase this TEOR production efficiency by a factor of 2 to 3, i.e., for equivalent GPGT production rates.

Concerning the second field related to the instant invention, salt recovery from sea water or brines via salt ponding, evaporation ponds for such purpose are an established practice. Typically, shallow ponds are filled with sea water and then the water is allowed to evaporate leaving behind solid sea salts that can be harvested. Spray evaporation ponds (SEP) utilize pump driven discharge nozzles exhausting over the pond surface to increase the surface area available for evaporative mass transfer; the driving potential for the mass transfer process is the difference between the vapor pressure of the discharging fluid and the water vapor pressure in the local air. Likewise, SEPs are in wide use for cooling, say, for heat rejection from power plants, although cooling towers are generally the preferred practice. The use of SEPs for salt recovery, while unknown to the author in practice, have been suggested by others (Lof, et al, 1972). However the invention disclosed herein is unique in its method of thermally charging the SEP process via waste heat from a brine distillation process. Brandt, et al (U.S. Pat. No. 5,695,643) teach a method for reducing recovered oil field waters, that require ultimate disposal, by use of a reverse osmosis unit coupled with a combustion heat evaporator, which is likewise distinguished from the present invention's use of SEPs.

The interfacing technology to this invention is found in U.S. Pat. Re. 36,282 (Nitschke, 1999), which best describes that aspect of the presently proposed method since that system is an integral part of the invention disclosed herein. Nitschke teaches producing GPGT brines through a well bore, flowing the brine to a hydraulic turbine for power generation, separating the gas, and then routing the brine to a multi-effect distillation unit for separating the GPGT source brine into saturated brine and distilled water end-products. Nitschke further teaches utilizing the saturated brine end-product for the large scale construction of solar ponds.

Within the applicable art, neither Marberry and Coutret (U.S. Pat. No. 3,572,4375; 1971) nor Alameddine (U.S. Pat. No. 4,986,352; 1991) provide discussion regarding a particular method for producing the steamflood, but rather teach enhancements to TEOR efficiency; whereas the instant invention illustrates a novel manner for producing said steamflood. Also the methods of Heins (U.S. Pat. No. 7,150,320; 2006) only address processes for treating recovered TEOR fluids purity in preparation for reuse as steamflood via a boiler, versus a specific TEOR steam generation method as taught in the present invention. Additionally, the present invention is distinguishable from the methods taught by Goldsberry (U.S. Pat. No. 4,824,447) and Jones (U.S. Pat. No. 4,319,635) as the GPGT brine is not used directly for the TEOR fluid, but only the water and steam extracted from the brine in a distillation process. Also, to further distinguish from Goldsberry, the option for gas injection with steamflood in the instant invention utilizes the CH4-rich GPGT gas, versus CO2-rich post-separation gas, and further utilizes the gas for TEOR process energy post recovery from the oil reservoir. Walter (U.S. Pat. No. 2,823,752) utilizes a combustion chamber on the surface to form steam and gas for TEOR by direct contact, which is clearly distinguished from the TEOR method of the instant invention, which utilizes the byproduct heat energies recovered from GPGT brine in a GPGT conversion system. The conventional co-generation steam production method, e.g., of Schlinger (U.S. Pat. No. 2,823,752), which likewise utilizes waste heat from a gas turbine to produce steam for TEOR, is distinguished from the instant invention which primarily utilizes the gas turbine (and other heat-engine cycles) to compress low-pressure steam, for TEOR injection, from a GPGT conversion system that is used to recover and convert GPGT energy for TEOR and other beneficial uses. The in-situ combustion TEOR methods taught by Clark (U.S. Pat. No. 4,458,756; 1984), Fleming (U.S. Pat. No. 4,699,213; 1987), and Horton, et al (U.S. Pat. No. 5,458,193; 1995) are obviously distinguished from the present invention, but were included to provide a wide background art. Likewise the use of electric boilers for steam generation, as taught by Kobro (U.S. Pat. No. 6,205,289; 2001), is clearly distinguished from the instant invention's use of a GPGT conversion system and products to facilitate TEOR steamflood.

The inventor believes the known prior art taken alone or in combination neither anticipate or render obvious the present invention. Reference to the foregoing materials does not constitute an admission that such disclosures are relevant or material to the present claims. Rather, such materials relate only to the general field of the disclosure and are cited as constituting the closest art of which the inventor is aware.

DISCLOSURE OF INVENTION

This invention builds upon a system previously taught by Nitschke in U.S. Pat. Re. 36,282. That system utilizes a wellbore which flows GPGT brine to a hydraulic turbine and gas separator, from whence the brine is distilled into its saturated salt water and pure distillate components in a multi-effect distiller. The present invention assumes the installation of that system. While a summary of that previously disclosed system is provided in this disclosure for context purposes, a more thorough treatment of that system is given in U.S. Pat. Re. 36,282, and the reader is directed to that former article for the details of that previously disclosed system.

The present invention furthers the usage of the end products from the previously disclosed system, namely the waste heat, water, and saturated brine. Also the present invention utilizes the gas produced from the GPGT brine in a fashion suited for the operation of the present system. This includes providing the thermal energy for the invention's method of TEOR.

The invention's primary TEOR method is steamflood, where a portion of the water distilled from the GPGT brine is used as feed stock, and gas from the GPGT brine is used to facilitate steam generation. A second optional mode for additional EOR is gas injection with the injected TEOR fluid. Gas recovered from the earlier invention's (Nitschke, 1999) surge tank and turbine separator are injected with the TEOR fluid, further promoting EOR. The gas so used is recovered with the oil and then utilized to promote steam generation for TEOR in the system disclosed in the present invention.

The improvements of the present invention upon present day TEOR practice include: [1] the TEOR fluid used for injection in the present invention can be reheated, replenished, and reused for TEOR after the oil has been separated at the surface, relieving environmental stresses in sensitive regions where brine disposal is restricted; [2] the initial and replenish feedstock for the TEOR injection fluid is water that has been distilled from the GPGT brine, mitigating operational restrictions due to a lack of a clean water source for feedstock (poor water quality is typically a limiting factor in TEOR, as noted by Marberry and Coutret in U.S. Pat. No. 3,572,4375); [3] the gas recovered with the GPGT brine can be first injected with the TEOR fluid and then utilized to generate steam for TEOR after recovery with the oil; [4] the gas which provides a majority of the thermal energy for TEOR is provided in-system by the GPGT brine, mitigating the need to procure the gas from out-of-system sources, or of burning a portion of the recovered oil for heating TEOR fluid as conventional practice in some areas, improving the economics and relieving environmental stresses; and [5] the distributed nature of the invention's TEOR method is more efficient at steamflooding oil reservoirs than centrally located TEOR steamflood methods like co-generation. The TEOR method as proposed herein reduces costs from one-half to one-fourth while increasing TEOR efficiency and relieving environmental stress over conventional practice.

The invention disclosed herein further provides for efficient and economical recovery of solid salt from GPGT brine. The salt recovery method uses a SEP to reduce the concentrated brine, exiting the earlier disclosed system (Nitschke, 1999), to solid salt precipitate, after it has been clarified to strip contaminants as the case warrants, and further uses heat from the distillation process to help drive evaporation in the SEP.

The invention disclosed herein is both unique in its methods and highly beneficial. It will provide an economically and environmentally sound method for recovering oil that would otherwise be only marginally recoverable by current practice, thereby increasing availability to U.S. domestic oil and reducing our near-term dependence of foreign oil. The salt recovery scheme also represents an improvement over existing evaporation schemes, requiring less land, and provides for efficient usage of all the GPGT energies, e.g., reject heat. Finally, the synergistic TEOR methods proposed herein will significantly improve the economics of the earlier proposed system (Nitschke, 1999), helping to achieve that earlier vision for a sustainable clean water supply via renewably powered coastal desalination, helping to solve the impending water shortage crisis in the western United States.

BRIEF DESCRIPTION OF DRAWINGS AND TABLES

FIG. 1 shows the envisioned best practice for the invention disclosed herein, i.e., enhanced oil recovery, in one of eight proposed configuration modes. Piping components such as valves, etc., are not shown for clarity but their appointment will be obvious to the practitioner after reading the enclosed discussion of the invention. The previously disclosed system of U.S. Pat. Re. 36,282 (Nitschke, 1999), typifying a Geopressured-Geothermal conversion system for which the current invention is intended to augment, is shown in the figure surrounded by a heavy dashed line.

Figures 8, 9:
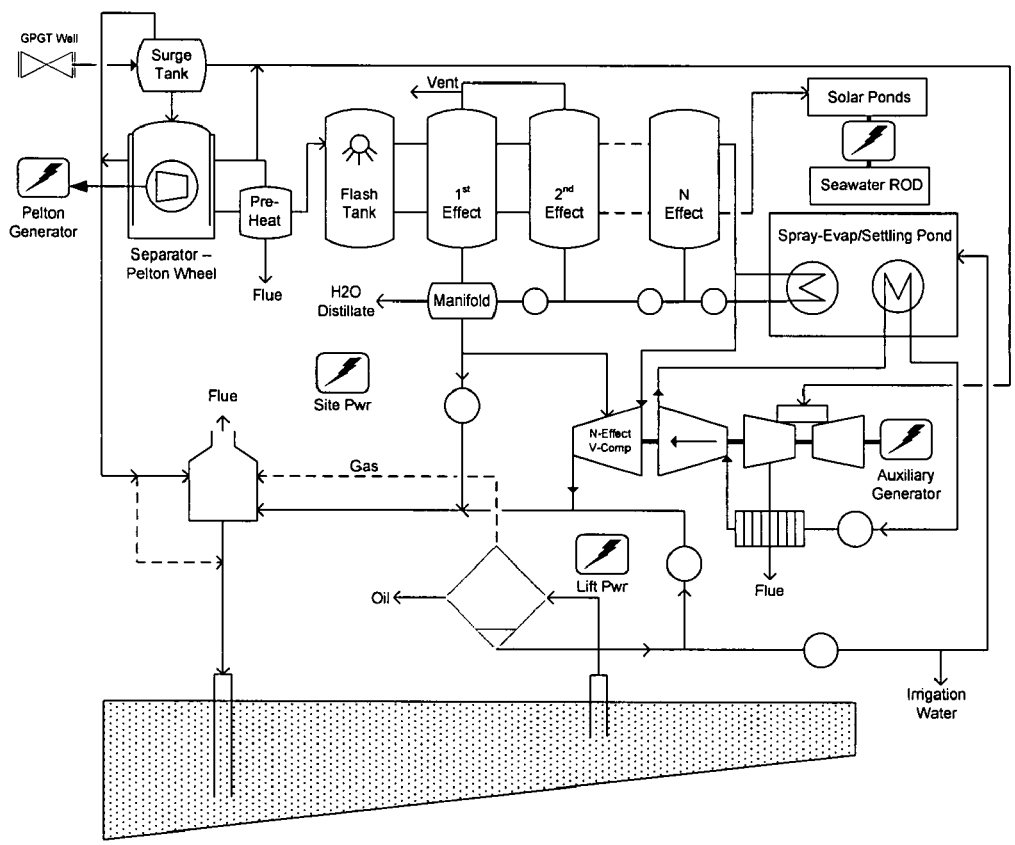

FIG. 8 depicts the FCS Operational Mode 3. This is the first of the power-cycle modes summarized in Tables I and IV. This mode is intended to maximize electricity generation, at the expense of heat for TEOR, by employing a combined Brayton-Rankine cycle system powered by the recovered GPGT gas.

Figure 6:
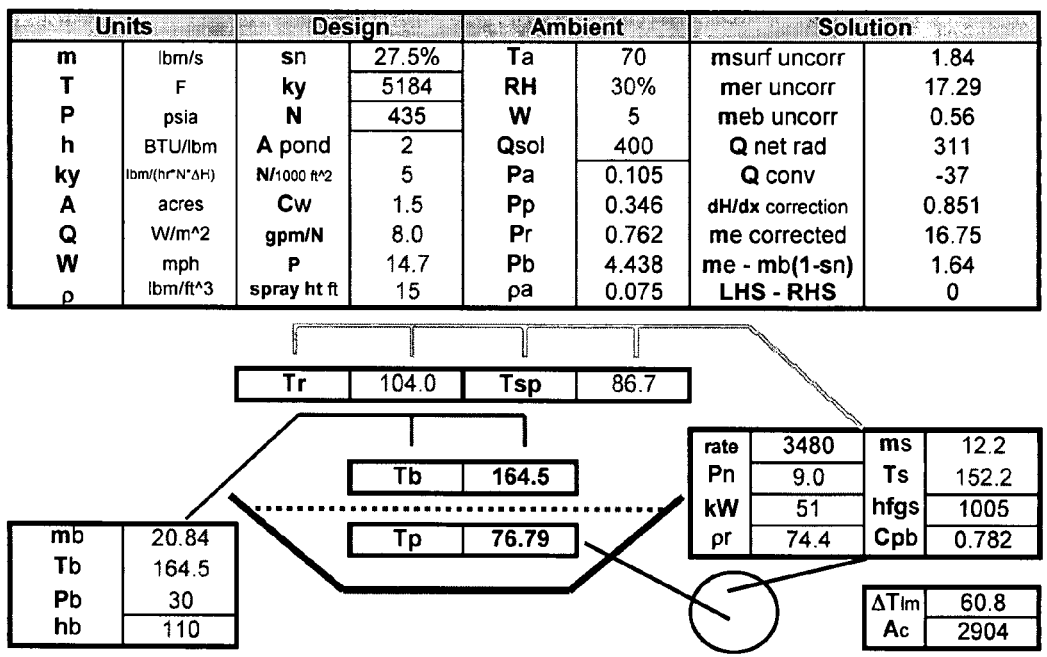
FIG. 6 shows example SEP performance, coinciding with the FCS Mode 1 performance provided in Table II. The units, ambient conditions, design parameters, and solution values are noted in the top half of the figure with the corresponding data describing the SEP conditions noted in the bottom portion of the figure.

FIG. 9 tabulates example performance data for a fresh water SEP corresponding to the FCS TEOR Mode 4 performance noted in Table III, like that as discussed for FIG. 6.

Figure 10:
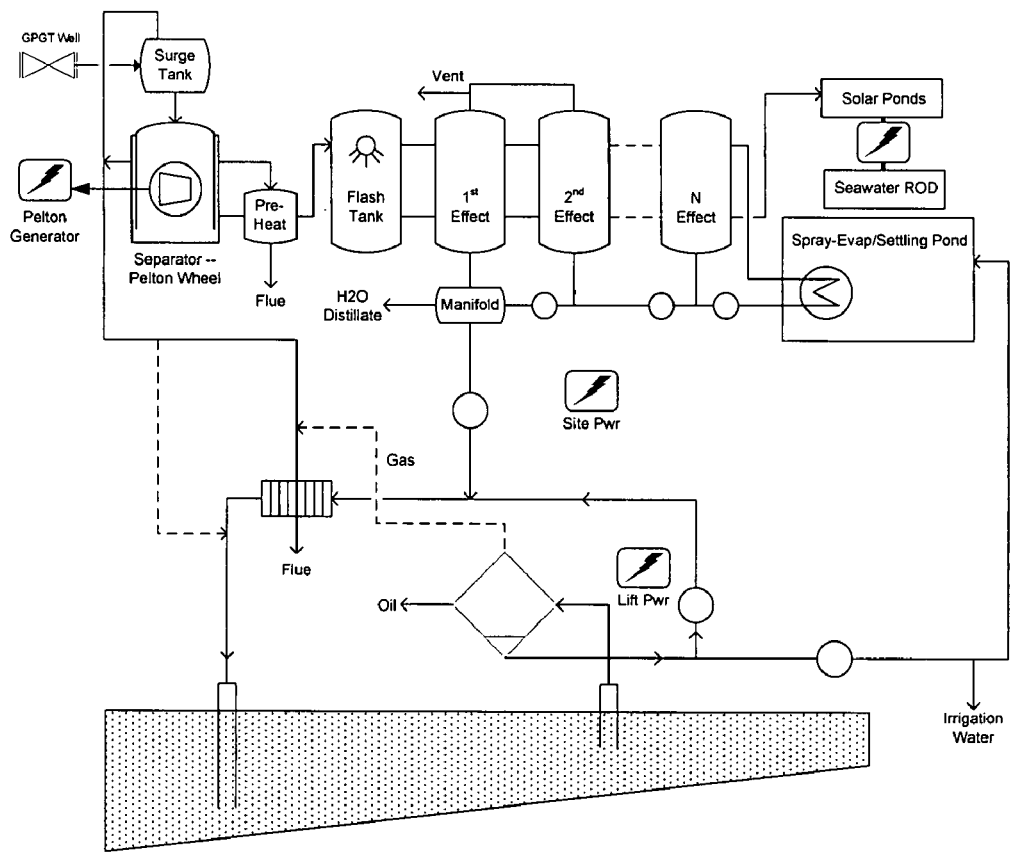

FIG. 10 depicts the FCS Operational Mode 5. Mode 5 is similar to Mode 2, except that the concentrated brine from the MED is routed to a suitable end-user versus being reduced to solid salt. In FIG. 10, the end-use for the concentrated brine is bulk material for the construction of solar ponds, as proposed in U.S. Pat. Re. 36,282 (Nitschke, 1999).

Figure 11:
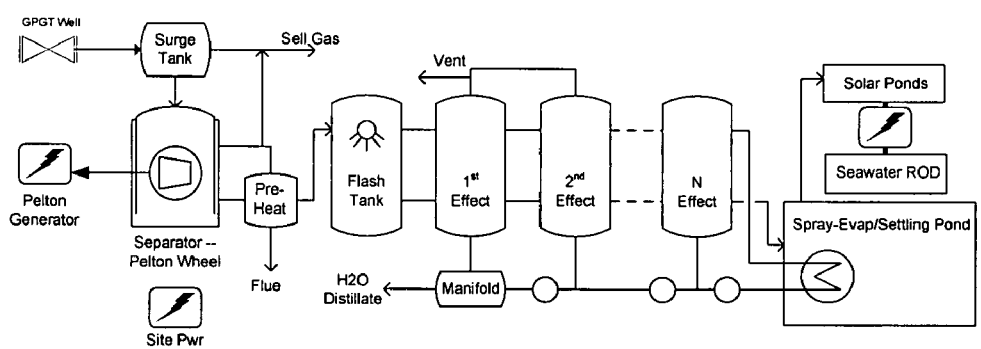

FIG. 11 depicts the FCS Operational Mode 6, which is the first of two modes intended for producing the GPGT resource without the attendant use of TEOR. In Mode 6, final concentration of the end-brine is accomplished in a SEP that uses the latent heat of the MED exit steam for this purpose, thereby also condensing the end-steam for recovery via pump. The concentrated end-brine is then routed to a suitable end-use, e.g., solar pond construction. In the non-TEOR FCS modes, the gas is separated and sold.

Figure 12:
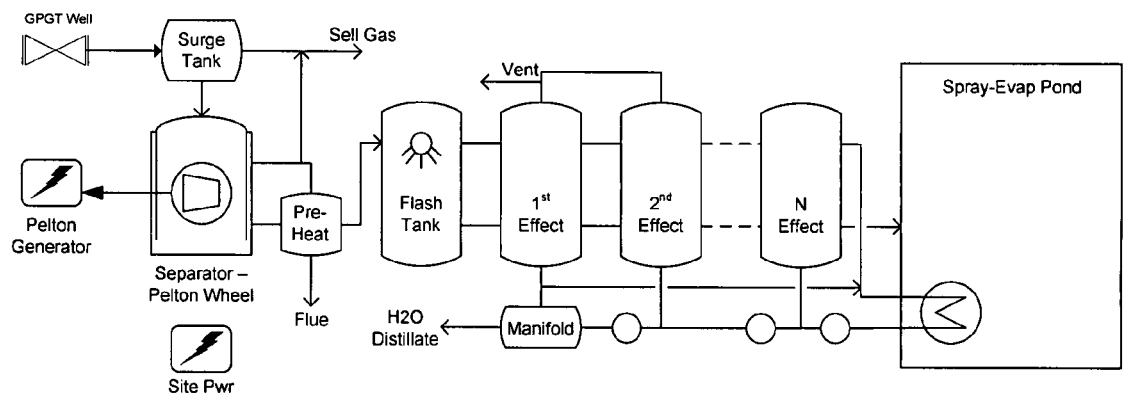

FIG. 12 depicts the FCS Operational Mode 7, also a non-TEOR FCS mode. Mode 7 is similar to Mode 6, except that the end-brine is reduced to solid salt.

FIG. 13 depicts Table I which lists the main distinguishing objectives and characteristics of the seven (7) Fluid Conditioning System (FCS) operational modes. Each of these modes is further described in the specification text.

FIG. 14 depicts Table II which lists the summary results of performance modeling for the entire system (GPGT conversion system and FCS), configured for FCS TEOR Mode 1. A thorough discussion of the modeling involved and specific output in the table is provided in the author's published doctoral dissertation (Nitschke, 2006).

FIG. 15 depicts Table III which lists the summary performance results, similar to Table II, for FCS TEOR Mode 4. Included with Table III are projections for the solar pond (SP) performance and the corresponding performance projections for a Reverse Osmosis Desalination (ROD) plant powered by a SP, of size resulting from five years of production for the systems (baseline production profile).

FIG. 16 depicts Table IV which summarizes characteristic attributes of the different FCS Modes.

FIG. 17 depicts Table V which summarizes the FCS TEOR performance projections, for a five-year and seven-year production life, using Gomaa's Method of estimating the TEOR performance. The corresponding steam-to-oil ratios (SOR) are noted in the table.

FIG. 18 depicts Table VI which compares the performance projections for the FCS (Mode 1 and Mode 4) using Gomaa's Method and a representative design point, with SOR and design point conditions as reported from a major operator in the Kern County, CA area. As can be seen from the table, the Gomaa's Method analysis with representative design point, as used throughout this work, is conservative with respect to reported field performance.

BEST PRACTICE FOR CARRYING OUT THE INVENTION

Figure 1:
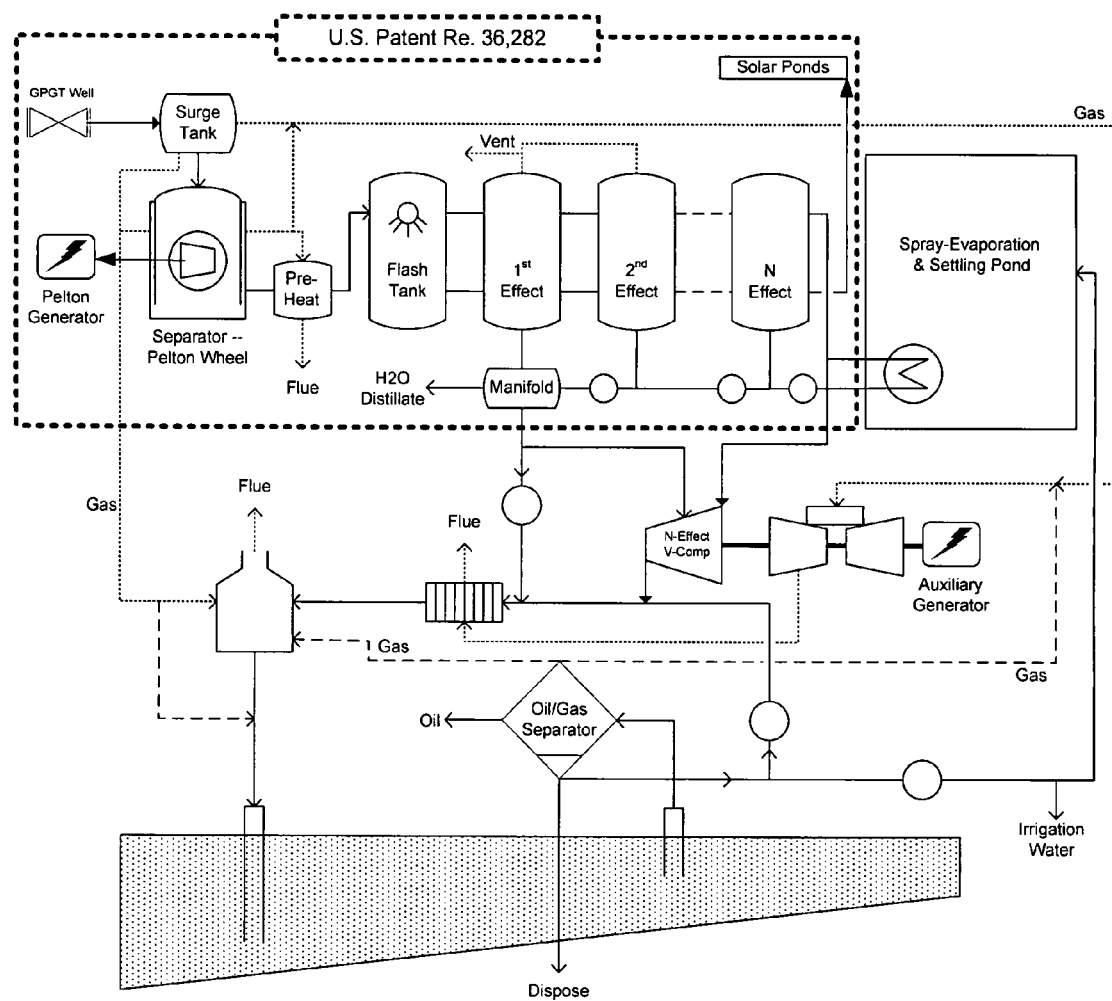

The following discussion of the systems and modes set out in the instant invention is considered to be the most likely practice of the invention. Namely, these systems will augment a GPGT conversion system (e.g., per U.S. Pat. Re. 36,282), primarily for enabling TEOR of collocated heavy oil, as depicted in FIG. 1, and secondarily for recovery and use of GPGT resources where there is no collocated heavy oil. Various operational modes of the invention are discussed. Alternately, the steam production from the instant involved systems could be utilized by other steam consumptive industries that require steam of the state and quantity within the range produced by the invention. Foreseen deviations in general operation of the invention are noted. The methods previously disclosed in Nitschke are discussed first to provide continuity in the description, although it is acknowledged that those methods are taught and claimed under U.S. Pat. Re. 36,282. Seven (7) different operational modes (configurations) of the currently disclosed invention are then discussed.

Additionally, wherever performance projections are provided, it should be noted that these are analyzed using assumed baseline GPGT well characteristics; site specific performance optimization, to account for variances to these baseline conditions, could alter the output as well as the final system configuration. Example configuration modifications resulting from site specific optimizations are noted where applicable.

For the following discussion, general reference should be made to FIG. 1. Detailed modeling and calculations, supporting the systems' operation and performance as described herein, are available with the author's published doctoral dissertation (Nitschke, 2006).

1. Geopressured-Geothermal Conversion System (U.S. Pat. Re. 36,282)

The following sections briefly describe the subsystems which comprise the GPGT conversion system, as typified by U.S. Pat. Re. 36,282. There are seven (7) different operational modes (configurations) envisioned for the currently disclosed invention; Mode 4 is depicted in FIG. 1 for illustration purposes. Site specific factors and production objectives will determine which of the invention's Modes is best suited for a certain site, e.g., availability of collocated oil, gas-water ratio (GWR), GPGT brine temperature, and proximity to markets.

1.1. GPGT Well

The first component of the GPGT conversion system is a producing GPGT well. For a California implementation, the well would be located in California's Great Valley region where there exists the second largest U.S. GPGT basin. A report by GeothermEx, Inc. (1993) provides a compilation of data for estimating the performance of California's GPGT reservoirs (i.e., pressure, temperature, gas content, TDS, etc.). Well performance data for implementation of a system in the Gulf Coast region are readily available in the literature, stemming particularly from Department of Energy (DOE) GPGT testing (e.g.: Wallace, R. H., et al, 1978; Dorfman, M. H., 1988; Negus-de Wys, et, al, 1990). The GPGT well is equipped with a control head that provides shut-in control for GPGT well.

1.2. Surge Tank

Unprocessed brine flows from the GPGT well into the surge tank as shown in FIG. 1. The surge tank damps pressure perturbations and separates the gaseous and liquid phases when the flowing pressure is below the bubble point pressure of the GPGT brine. This ensures a single, liquid phase in-flow to the hydraulic turbine. The surge tank is a simple baffled pressure vessel, capable of withstanding the well's flowing pressure and designed with sufficient liquid free surface area for evolving the gas as required. As a part of the currently disclosed invention's EOR, the high-pressure surge tank gas can also be injected directly into the TEOR fluid for additional enhanced oil recovery. The gas so injected would be recovered with the EOR return fluid and then used to promote TEOR in the Fluid Conditioning System (FCS), which is a primary system of the current invention, as discussed in a later section. This particular routing of the gas separated at the surge tank, depicted by the dashed lines in FIG. 1, is an optional configuration for several of the FCS modes. In U.S. Pat. Re. 36,282, the gas separated from the surge tank and main separator is mainly sold, versus being consumed on site for EOR/TEOR.

1.3. Pelton Turbine and Gas Separator

The surge tank exit brine is passed to a single-nozzle Pelton-type hydraulic turbine for recovering the GPGT well's mechanical energy. The power produced by the turbine is directly proportional to the GPGT flow rate and pressure drop across the turbine. Most of the surface system's pressure drop occurs across the turbine nozzle, which effectively serves as a flow-control choke for the GPGT well. The turbine brine discharges into the main gas separator where gas is further withdrawn. The gas separator pressure (turbine back pressure) can be controlled to govern the composition of the withdrawn gas, e.g., water vapor and $CO_2$ content. The gas so recovered is either used on site or routed to a pipeline for sale. The turbine is coupled to a generator for the production of electricity. The electricity is intended for on-site consumption, with any surplus sold back to the grid.

1.4. Pre-Heater

The degassed brine leaving the separator is passed through the Pre-Heater, which can use a portion of the gas to raise the brine temperature into the Multi-Effect Distillation (MED) unit, should that prove advantageous for optimizing system cost and performance. Elevating the brine temperature into the MED reduces the required MED heat exchanger (HX) area, which reduces the MED capital cost.

1.5. Multi-Effect Distillation System

The brine exiting the Pre-Heater is routed into the MED. The MED concentrates the brine to near saturation, recovers the $H_2O$ distillate, and provides process heat for use in the MED end-effect condenser, for spray evaporation pond (SEP) process heat, and the TEOR FCS, for TEOR process heat; the SEP and FCS are both systems of the current invention. The MED design (No. of effects, HX areas) will depend on site specific factors, e.g., GPGT source characteristics and TEOR FCS requirements. Non-condensable gasses are bled from the higher pressure effects (e.g., flared). Modifications are made to an off-the-shelf MED design to facilitate recovering the distilled water from each of the MED's effects to the MED Manifold to provide process heat for the TEOR FCS; this provides water at higher enthalpy than would otherwise be available from flashing the water down-cascade (conventional practice). Various modes for utilizing this process heat are discussed in the section covering the FCS. The concentrated brine exiting the MED is recovered from the low pressure end by a pump.

2. Enhanced Oil Recovery and Salt Brine Management Systems

The following sections describe the configurations and operations of the subsystems for the invention presently being disclosed. These subsystems comprise the EOR systems (primary objective) and salt brine management systems (secondary objective) which are intended to augment a GPGT conversion system. It is noted here, as discussed in U.S. Pat. Re. 36,282 and as depicted in FIG. 1, that the preferred use of the saturated salt brine exiting the MED is for the construction of solar ponds for renewable energy production. The salt brine management systems discussed herein are offered as an alternative to that usage. In addition to routing the end-brine directly to a consumptive user (e.g., solar pond construction), the method of this invention manages the end-brine by either employing spray evaporation ponds to reduce the brine to solid salt for sale, or disposing the concentrated end-brine in a suitable subterranean formation.

2.1. System Condenser(s)

Depending on the FCS mode, none, some, or all of the steam from the last MED effect is condensed to allow for efficient withdrawal of the final distillate via pump. The MED end-effect condenser is used to condense this end-effect steam as required. One use for the latent heat from the steam is to increase the SEP recirculation stream temperature, thereby promoting enhanced brine evaporation for the production of solid salt (discussion follows). Other system condenser configurations and uses are discussed with the FCS below.

The relationship for the heat exchange between the system's condenser(s) (e.g., the MED end-effect condenser) and the SEP recirculation fluid (for either reduction to solid salt, brine concentration, or for a cooling pond) is:

$$\dot{Q} = \dot{m}_{v_N} h_{fg_{steam}} = \dot{m}_{SEP} c_{p_{SEP}} \Delta T_{SEP} \quad (a)$$

And the elevation of the SEP recirculation fluid stream temperature can be expressed as:

$$(b) \quad \Delta T_{SEP} = \frac{\dot{m}_{steam}}{\dot{m}_{SEP}} \cdot \frac{h_{fg_{steam}}}{c_{p_{SEP}}}$$

Where:
$\dot{m}_{v_N}$ = mass rate of steam exiting the MED End-Effect
$\dot{m}_{SEP}$ = mass rate of SEP recirculation fluid
$h_{fg_{steam}}$ = latent heat of vaporization for the MED End-Effect steam
$c_{p_{SEP}}$ = specific heat of the SEP recirculation fluid The steam flow to the system's condenser(s) can come from more than one source (e.g., combined-cycle waste heat FCS mode, discussed below), requiring more than one condenser. In those cases the SEP fluid temperature rise will be related to the sum of the steam flows, viz:

$$(c) \quad \Delta T_{SEP} = \frac{\sum (\dot{m}_{v_N} h_{fg_{steam}})_i}{\dot{m}_{SEP} c_{p_{SEP}}}$$

Figure 2:
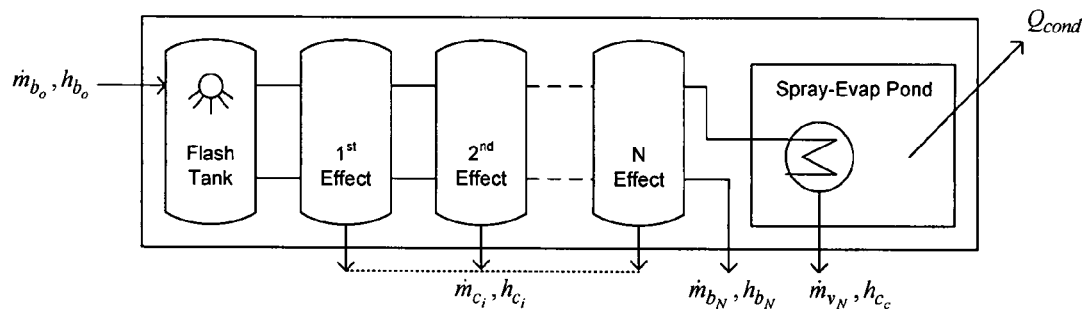
FIG. 2 depicts a representative control volume for modeling the heat recovered from the Multi-Effect Distillation (MED) system to promote evaporation in the SEP.

Water can be bled from the MED Manifold and flashed to the (low pressure) condenser to supplement the latent heat from the end-effect steam to further enhance SEP evaporation. For the MED control volume in FIG. 2, the heat transferred to the SEP, i.e., $Q_{cond}$, can be written as:

$$(d) \quad Q_{cond} = m_{b_o} \left[ h_{b_o} - h_{c_c} - \frac{s_o}{s_N}(h_{b_N} - h_{c_c}) \right] - \left[ \sum \dot{m}_{c_i} h_{c_i} - h_{c_c} \sum \dot{m}_{c_i} \right]$$

Where:
$s_o, s_N$ = inlet brine salt mass fraction and exit brine salt mass fraction respectively
$h_b, h_c$ = brine and condensate enthalpies respectively The second term in brackets on the RHS of (d) represents the heat withdrawn from the system via the condensate extracted from each effect, which could have otherwise been used to evaporate fluid in the SEP (Note the first term in brackets on the RHS of (d) is fixed for a given $\{s_o, S_N, T_N\}$, where $T_N$ is the end-effect temperature. For baseline values, this added heat would increase the SEP $Q_{cond}$ by up to ~35% (maximum amount of heat recovered). For configurations where the objective is to reduce the brine to solid salt, this added heat would improve SEP performance, reducing the required size of the SEP. Adding this heat source, the temperature rise in the SEP fluid then approaches:

$$(e) \quad \Delta T_{SEP} = \frac{\sum (\dot{m}_{v_N} h_{fg_{steam}})_i + \left[ \sum \dot{m}_{c_i} h_{c_i} - h_{c_c} \sum \dot{m}_{c_i} \right]}{\dot{m}_{SEP} c_{p_{SEP}}}$$

2.2. Spray Evaporation Pond

Figure 3:
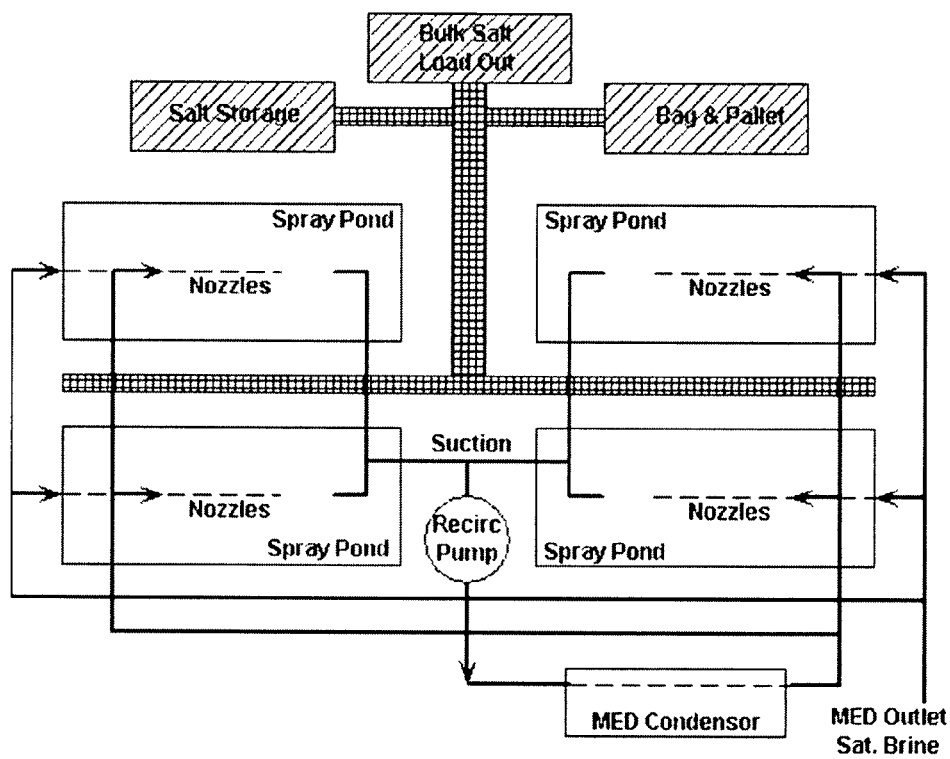
FIG. 3 shows a notional layout of the SEP system, in a four-unit configuration. The main elements of the system are shown: nozzle networks, recirculation pump, condenser, salt conveyance and processing facilities.
Figure 4:
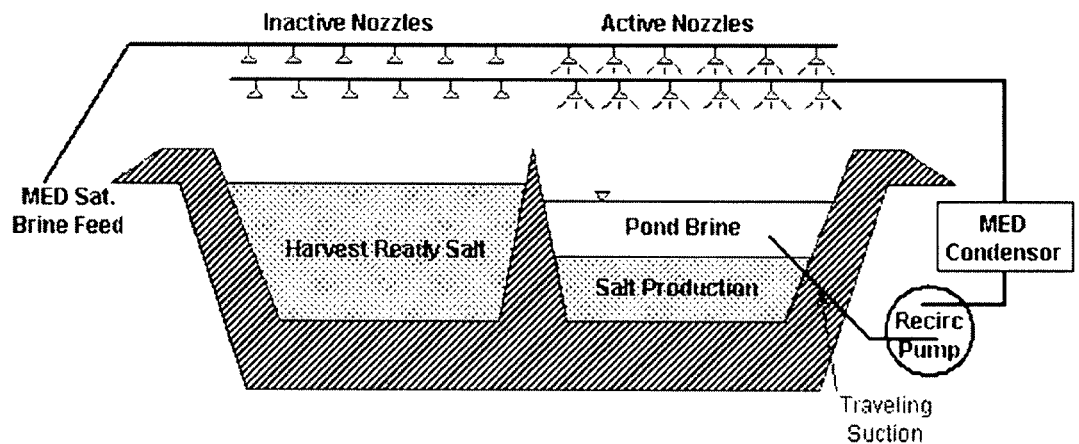
FIG. 4 depicts the solid salt precipitating and accruing within the SEP system. Salt harvesting is facilitated by switching operation to the active units from those which have a suitable salt depth for efficient harvesting with, e.g., a front-end loader.

When the operational mode calls for reducing the end-brine to solid salt (e.g., versus flowing MED product brine to construct solar ponds as depicted in FIG. 1) the brine is routed to spray nozzles that discharge into the Spray Evaporation Pond (SEP), as depicted in FIG. 3 and FIG. 4. A portion of the saturated brine water evaporates at the supply spray nozzle discharge, causing salt (mostly NaCl) to precipitate to the pond bottom. A separate spray nozzle network is driven by a pump (between the two lower ponds in FIG. 3) which recirculates the standing brine. The recirculated pond brine is routed through the MED end-effect condenser to both condense the MED end-effect steam and raise the recirculated brine temperature as noted above in 2.1.(e); heating the recirculated SEP brine greatly enhances evaporation by increasing the difference between the nozzle discharge temperature and the local wet bulb temperature. The recirculation pump controls the recirc-nozzle flow rate and pressure, which affect the evaporative mass transfer from the SEP to the ambient. Other SEP design performance control features are the nozzle height from the pond surface, nozzle size, and nozzle density. These design features can be adjusted to optimize the SEP performance regionally, e.g., to compensate for diurnal and seasonal ambient changes to humidity, wind, temperature, and solar loading. Sizing the SEP for the particular site and GPGT source, along with trim control of the noted SEP mass transfer coefficient parameters (i.e., pump rate and pressure, nozzle density and height) and source heat (e.g., MED manifold flow), will maintain a balanced operation of the SEP system (quasi-constant standing brine volume over an ever-increasing precipitated salt bed depth). Additionally, the SEP system can be used for a cooling pond (e.g., fresh-water operation), or as a final concentrator of the MED brine (versus total reduction to solid salt); these operational modes are discussed further with the FCS below.

A four-pond layout is shown in FIG. 3, where nominally two ponds would be in production mode while the other two are being harvested, as depicted in FIG. 4. To conceptualize the salt harvesting operation, consider the MED brine is flowing to only two of the four ponds in FIG. 3 at any one time. Once the salt bed reaches an efficient depth for harvesting, the evaporation process is transferred to the other two ponds, which have completed their harvesting cycle: the supply and recirculation brine streams are diverted to the other two pond nozzle networks; the standing brine volume is drained to the other two ponds for start-up recirculation volume; and the remaining salt bed is harvested, as shown in FIG. 4. A soft tired front end loader could be used to move the solid salt to conveyor belts for transport to the handling areas, i.e., Bulk Salt Load Out, Bag & Pallet Operation, and/or Salt Storage, as shown in FIG. 3. Other harvest schemes might have three of the pond units in spray operation with the fourth under harvest, depending on local or seasonal conditions, e.g., high humidity regions requiring more pond area to achieve the desired mass transfer. The conveyor system can be equipped with an in-line sieve and granulator to achieve a desired consistency, determined by market requirements and handling equipment operation.

The SEP performance was modeled using modified formulae developed and published by the U.S. Department of the Interior (DOI, 1972). The DOI work models the SEP characteristics from first principles and compares the analysis with field performance data, to good agreement. The modeled key characteristics include: spray nozzle pressure, size, and height from the pond surface; nozzle density; driving humidity potential; and wind speed. The DOI report contains manufacturer design data for a range of spray nozzles. The applicable DOI model equations are modified to include the two key differences between the SEP in the present invention and a conventional SEP. In a standard, thermally neutral, SEP the pond is simply recirculated through spray nozzles to enhance evaporation. Whereas the invention's SEP is continually supplied with hot, saturated brine discharge from the MED while the SEP brine is recirculated through the MED's end-effect condenser (or other system condenser), capitalizing on the system's low end process heat. These two differences greatly enhance the performance of the invention's SEP over that of a standard SEP. Using a $1^{st}$ Law control volume approach (SEP and nozzle systems, excluding the recirculation pump and MED condenser) to account for the heat and mass transfer, the following can be written (steady state):

$$\dot{Q}_{pond} + \dot{m}_b h_b + \dot{m}_p h_r = \dot{m}_{e_b} h_{e_b} + \dot{m}_{e_r} h_{e_r} + \dot{m}_p h_p$$

Where:
$\dot{Q}_{pond}$=net convective and radiative heat into the SEP (ground conduction neglected)
$\dot{m}_b$=mass rate of brine into the SEP from the MED discharge
$h_b$=enthalpy of the MED brine discharge into the SEP
$\dot{m}_p$=mass rate of recirculated SEP brine
$h_r$=enthalpy of the inlet SEP recirculated brine
$\dot{m}_{e_b}$=mass rate of evaporated water from the MED discharge brine
$h_{e_b}$=enthalpy of the evaporated water from the MED discharge brine
$\dot{m}_{e_r}$=mass rate of evaporated water from the recirculated SEP brine
$h_{e_r}$=enthalpy of the evaporated water from the recirculated SEP brine
$h_p$=enthalpy of the SEP standing brine inlet to the recirculation pump The non-ambient heat addition to the recirculation brine can be written as:

$$\dot{m}_p h_r - \dot{m}_p h_p = \dot{m}_p c_p (\Delta T_{pump} + \Delta T_{condenser})$$

$$= \dot{m}_p c_p \left( 5.67 \frac{\dot{W}}{\dot{V}} + \frac{\dot{m}_s h_{fg}}{\dot{m}_p c_p} \right)$$

Where
$\dot{W}$=pump power, kW
$\dot{V}$=pump flow rate, gpm
$\dot{m}_s h_{fg}$=latent heat into the end-effect condenser from all sources, BTU/s
5.67=conversion factor to yield ° F. for sat. brine at representative temperatures For representative values (e.g., 42 kW, 2200 gpm, 11.4 pps steam@134° F.):

$$5.67 \frac{\dot{W}}{\dot{V}} \ll \frac{\dot{m}_s h_{fg}}{\dot{m}_p c_p} \text{ (i.e., } \Delta T_{pump} \text{ is negligible compared to } \Delta T_{condenser}\text{)}$$

Therefore:

$$\dot{m}_p h_r - \dot{m}_p h_p \approx \dot{m}_s h_{fg}$$

And the $1^{st}$ Law CV relationship can be recast as:

$$\dot{m}_b h_b + \dot{m}_s h_{fg} = \dot{m}_{e_b} h_{e_b} + \dot{m}_{e_r} h_{e_r} - \dot{Q}_{pond}$$

The LHS of (a) represents the heat and mass addition from the MED (~14 MW for baseline conditions), which increases the SEP performance ~10× to a conventional, non-heated SEP. The cited reference (DOI, 1972) develops the formulae for modeling the evaporated water mass from the spray nozzles, including the subsequent evaporative exchange, as the spray droplets travel to the pond surface, and from the SEP surface itself. The modeling also includes an adjustment to compensate for varying humidity along the SEP surface wind path. The resultant model equation is combined below (equation Nos. 146-148, 196 in the reference).

(b) $$\hat{\dot{m}}_e = \left( \frac{M_v}{M_a} \right) \left( \frac{\bar{P}_n - \bar{P}_a}{P} \right) \left( C_w W + \frac{k_y N}{A} \right) \left( \frac{5280 W h \rho_a}{k'_y L + C_w W L} \right)$$
$$\left[ 1 - \exp\left( \frac{k'_y L - C_w W L}{5280 W h \rho_a} \right) \right]$$

Where
$\hat{\dot{m}}_e$=evaporative mass rate, lbm/(hr)(sq.ft. SEP area)
$M_v$=molecular weight of water
$M_a$=molecular weight of air
$\bar{P}_n$=saturated vapor pressure of spray brine at nozzle discharge
$\bar{P}_a$=partial pressure of water vapor in surrounding air
P=atmospheric pressure
$C_w$=mass transfer coefficient for flat surface, lbm/(hr) (sq.ft.)(MPH wind)(unit $\Delta$H)
W=wind speed, MPH
$k_y$=mass transfer coefficient per nozzle, lbm/(hr)(nozzle) (unit $\Delta$H)
$k'_y$=$k_y$/L, where L=windward path, ft (for this modeling, L≈sqrt[A])
N=No. of spray nozzles
A=SEP surface area, sq.ft.
h=height of nozzles from SEP surface, ft.
$\rho_a$=air density, lbm/cu.ft.

The following relationships apply the above modeling directly to the SEP solution of (a):

(c) $$\dot{m}_{e_b} = A \left( \frac{\dot{V}_b}{\dot{V}_b + \dot{V}_p} \right) \frac{\hat{\dot{m}}_e\{T_b\}}{3600} \quad \dot{m}_{e_r} = A \left( \frac{\dot{V}_p}{\dot{V}_b + \dot{V}_p} \right) \frac{\hat{\dot{m}}_e\{T_r\}}{3600}$$

Where the $\hat{\dot{m}}_e\{T\}$ is meant to imply the function $\hat{\dot{m}}_e$ in (b) evaluated at the applicable brine temperature T. For balanced SEP operation producing solid salt, the following relationship (d) applies (same relationship applies for zero-discharge, fresh-water operation with $s_N$=0):

$$\dot{m}_{e_r} + \dot{m}_{e_b} - \dot{m}_b(1 - s_N) = 0 \quad s_N \text{=salt mass fraction of MED brine}$$ (d)

2.3. Fluid Conditioning System

Seven FCS Modes are listed in Table I per their main objectives and characteristics, e.g., whether solid salt is being produced, whether the gas is being sold or consumed on-site for TEOR, etc.; the first five modes are used for TEOR and the last two modes produce the GPGT for gas recovery and salt production. For the TEOR modes, the water and steam produced by the MED, along with the gas separated from the GPGT brine, are used by the FCS to maximize the injected heat for TEOR.

2.3.1. FCS Mode 1

Figure 5:
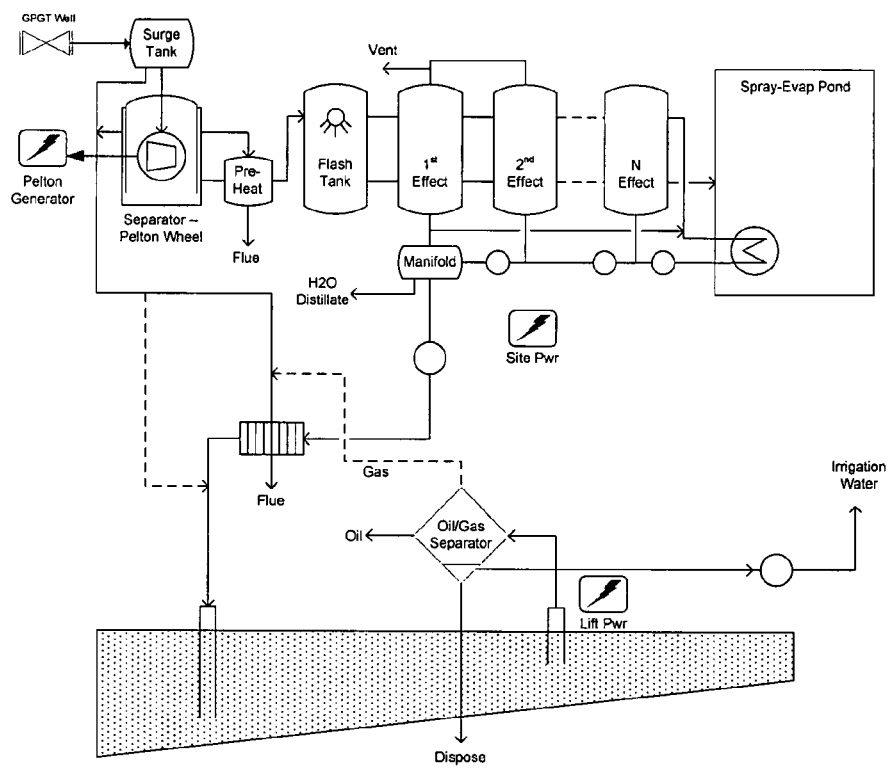
FIG. 5 depicts one of the simplest modes for TEOR utilizing the Fluid Conditioning System (FCS) of the instant invention, coined Operational Mode 1. This mode provides for solid salt recovery from the concentrated end-brine, employing the end-heat from the MED exit steam to promote evaporation in the SEP.

The FCS Mode 1 configuration is shown in FIG. 5. Mode 1 operation uses hot distilled water/steam flood with optional gas injection (dashed lines in figure) for TEOR, and reduces the MED saturated exit brine to solid salt for sale. The GPGT gas recovered at the surge tank and gas separator is used on site to fire a boiler for TEOR process heat, and the power requirements (e.g., site requirements, pumping the manifold water to TEOR injection pressure, oil lifting) are provided by the Pelton Generator, or provided by purchased power as required. The returned TEOR fluid is separated in the oil-water-gas separator, and the separated by-product water can be used for irrigation, etc., with the bottoms disposed in a suitable disposal well or settling pit. A portion of the produced MED H2O distillate can be withdrawn for sale from the manifold, governed by the required TEOR fluid injection rate to optimize oil recovery (e.g., achieving optimal injection steam quality per available GPGT gas). Non-condensables are bled from the first effects of the MED. A portion of the H2O distillate from the MED manifold is flashed to the SEP condenser to enhance SEP performance (note line in FIG. 5), as discussed above in the section on the system condensers. Mode 1 represents the lowest capital investment and equipment footprint of the FCS TEOR modes (e.g., no brine conveyance requirements) and will be effective for proofing the GPGT resource and the TEOR efficiency of the collocated heavy oil reservoir. It should be noted that the anticipated levels of salt production (~200 ton/day per system) would saturate local salt markets with relatively few systems, hence the mode has limited application, e.g., for piloting and proofing, etc.

The FCS Mode 1 performance projections for baseline GPGT conditions are shown in Table II. The two left-hand columns indicate the system location, on FIG. 5, for the state projections (mass rate W, pressure P, temperature T) in that given row of the table. For instance, from the Pre-Heater to the MED, there is 80.76 lbm/sec (pps) brine flowing at 200 psia and 300F; note this is approximately less than the GPGT well flow of 81.6 pps (GPGT Well to Sep-Turbine) by the 0.729 pps gas withdrawn for the FCS (Sep-Turbine to TEOR FCS). Negligible round-off errors are due to the use of slightly different computational models for the various system components. The far right-hand column in the table contains other useful information, e.g., the Pelton turbine-generator output power of 600 kW (Sep-Turbine to out), or x=0.40 steam quality for the TEOR steamflood (TEOR FCS to TEOR). More will be said regarding the state of the steamflood in a following section, e.g., pressure, quality, etc.

In particular note that 3.33 pps steam has been flashed from the manifold to further enhance SEP performance, i.e., the difference between 12.2 pps (Condenser to SEP) and 8.87 pps (MED to TEOR FCS) in Table II. The corresponding SEP performance for this example is shown in FIG. 6. Note the "ms=12.2" (lbm/s) and "Ts=152.2" (F), in the lower right-hand boxes of the figure depicting the condenser performance, correspond to the "Condenser to SEP" mass rate and temperature of Table II (the steam temperature is less than the 164.5F brine temperature by the boiling-point-rise, noted as "BPR" in the table). The lower left-hand portion of the figure indicates the brine conditions inlet to the SEP (also corresponding to values given in Table II), the lower middle portion depicts the calculated pond conditions, and the upper half of the figure reflects the design calculations discussed above for the SEP modeling. The reader is directed to Nitschke (2006) for further details on the modeling and results.

2.3.2. FCS Mode 2

Figure 7:
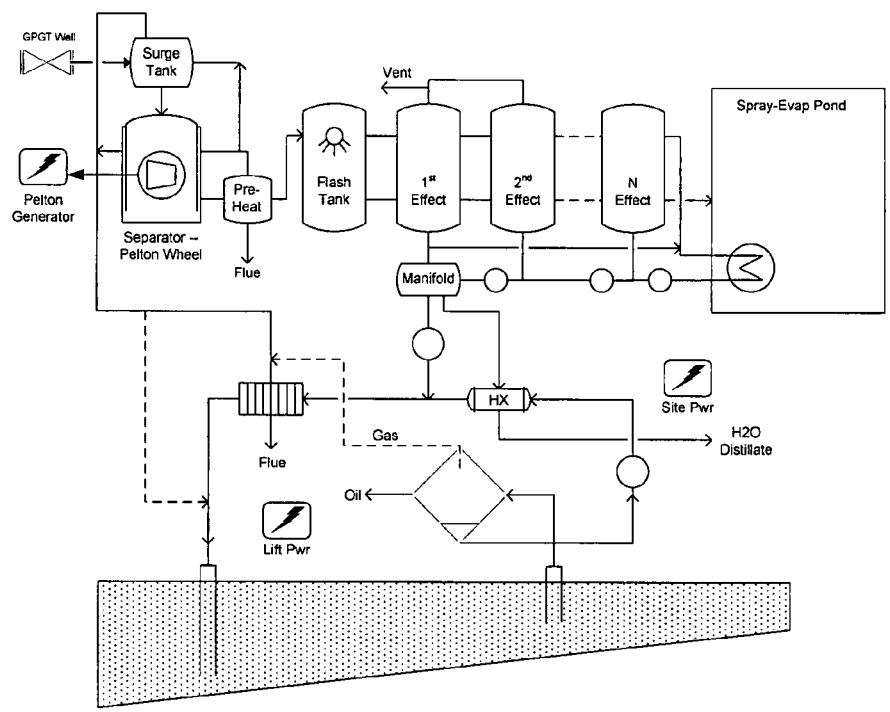
FIG. 7 depicts the FCS Operational Mode 2. Mode 2 is identical to Mode 1 (FIG. 5) with the addition of the capability to recirculate, regenerate, and reuse most of the recovered TEOR fluid.

The FCS Mode 2 configuration is shown in FIG. 7. Mode 2 operation is identical to Mode 1, except that a portion of the TEOR discharge fluid is thermally regenerated and reused for EOR versus diverted for irrigation, etc. In some sensitive areas, or in cases where the TEOR discharge fluid cannot be adequately treated for end-uses like irrigation, this recirculation option may be necessary. To accomplish this, a portion of the MED manifold distillate is pumped to TEOR injection pressure and added to the recirculated EOR fluid to replace whole losses (i.e., make-up). The remainder of the MED Manifold distillate is routed to a heat exchanger where it transfers heat to the recovered EOR fluid, as shown in FIG. 7. The TEOR performance of Mode 2 is only slightly less than that for Mode 1: at the steamflood conditions noted in Table II (200 psia, x=0.4) Mode 1 delivers 20.71 pps steam and Mode 2 delivers 20.39 pps.

2.3.3. FCS Mode 3

The FCS Mode 3 configuration is shown in FIG. 8. Mode 3 is one of four modes designed to produce saturated brine for the construction of solar ponds to promote renewably powered seawater desalination, as illustrated in FIG. 8. Mode 3 uses a combined-cycle scheme to compress the MED end-effect steam and produce auxiliary power as needed (e.g., to augment power for heavy oil lift where required). The main components of the Mode 3 scheme, depicted in the figure, are a Brayton-Rankine combined cycle driving a vapor compressor and auxiliary generator on a common shaft. Recent advances in combined-cycle technology allow power cycles approaching 60% thermal efficiency (e.g., GE's H System); this mode is the most efficient at recovering shaft power for auxiliary power generation and vapor compression. Any excess gas not required for the combined-cycle would be used to provide additional heat to the TEOR fluid via the boiler as shown in the figure.

Further, as was shown for Modes 1 and 2, the dashed line in the figure is meant to indicate the gas-injection EOR option, i.e., recover gas for site use after EOR at the separator (while not shown in FIG. 8 but as depicted in FIG. 1, the gas so recovered could also be used for the combined cycle). The prioritization between power recovery for vapor compression and electricity generation will be site-specific, e.g., depending on GWR, power requirements for lift, and effectiveness of incremental heat increases on TEOR. The end-heat from the Rankine portion of the combined-cycle is rejected to a fresh water SEP, i.e., operation similar to a cooling tower with water supplied from the EOR return fluid; as such, the SEP could also serve as a settling pond for the bottoms. The SEP is zero-discharge, i.e., inflow totally evaporated by the low-end process heat.

Where full compression of the MED end-effect is not desired, or where sufficient gas is not available to fully power the vapor compression while meeting the auxiliary power requirements, some or all of the MED end-effect steam will also be condensed in the SEP with a separate condenser (note two condensers shown in FIG. 8); both condenser heat loads will then size the SEP. This operation will help ensure good clean-up of the remainder of the EOR return fluid, so that other end-uses are available (e.g., irrigation). If the site is sensitive to this use, however, the EOR return can be recirculated as in Mode 2, with the desired flow-balancing accomplished by withdrawing H2O condensate from the MED manifold, i.e., open the "H2O Distillate" valve as the "Irrigation Water" valve is closed (valves not shown in FIG. 8). No water is flashed to the end-effect condenser in this mode, however distillate is supplied to the vapor compressor for inner-evaporative cooling (discussion follows).

The power train performance can be modeled as follows, with example output for notational values at baseline conditions provided below. For the power recovered from the Brayton cycle (gas turbine), vendor data (i.e., $\eta_{Brayton}$) can be used directly to estimate the performance, viz:

$$\dot{W}_{Brayton} = \eta_{Brayton} \cdot \dot{Q}_{available} = \text{"Pwr-BRAY"}$$

Where "eta-Brayton" and "QAVAIL" relate to the recovered power from the gas turbine's contribution "Pwr-BRAY" (3665 kW in the example output below). The Brayton-cycle to discharge heat, recovered from the turbine's exhaust, available for powering the Rankine-cycle is then computed as:

$$\dot{Q}_{Rankine} = (1 - \eta_{Brayton}) \cdot \dot{Q}_{available} \cdot \eta_{burner} = \text{"QRANKINE"}$$

The isentropic specific-work of the Rankine turbine is:

$$w_{iso} = P_{in} v_{in} \frac{n}{n-1} \left[1 - \left(\frac{P_{out}}{P_{in}}\right)^{\frac{n-1}{n}}\right]$$

With "Ptur-in", "Ptur-out" defining the inlet and outlet pressure respectively, n=1.328 (steam) given, and the specific volume from steam tables $v_{in} = f\{\text{Ptur-in, Tur-Stm-T}\}$, where the P,T values are taken from vendor data. The Rankine mass rate is determined (neglecting the heat addition of the pump):

$$\dot{m}_{turbine} = \frac{\dot{Q}_{Rankine}}{h_{in} - h_{condense}} = \text{"RANK-stm"}$$

Where the enthalpies are determined from the inlet, exit states. Then $$\dot{W}_{Rankine} = \eta_{Rankine} \dot{m}_{turbine} w_{iso} = \text{"Pwr-RANK"}$$

where $\eta_{Rankine}$ can be taken from handbook estimates, and the turbine exit quality:

$$x_{turbine-exit} = \frac{h_{in} - \eta_{Rankine} w_{iso} - h_{condense}}{h_{fg_{out}}} = \text{"X-RANKINE TURBINE"},$$

since $\Delta h_{real} = \eta_{Rankine} w_{iso}$. The heat rejected to the SEP is then:

$$\dot{Q}_{SEP_{Rankine}} = x_{turbine-exit} \cdot \dot{m}_{turbine} \cdot h_{fg_{condense}}$$

Inner-evaporative cooling is assumed for the vapor compression process, i.e., water is withdrawn from the MED manifold and injected into the vapor compressor to maintain compression along the P-V{sat-vapor} curve, such that k=1.063 (approximately), thereby reducing the required work of compression while significantly adding to the steam volume for TEOR. The amount of water required ($\Delta \dot{m}_{manifold}$ = "DELM") for the evaporative cooling can be estimated from isentropic compression:

$$T_{2_{iso}} = T_{v_N} \left(\frac{P_{EOR}}{P_{v_N}}\right)^{\frac{n-1}{n}}$$

$$T_{2_{real}} = T_{v_N} + \frac{(T_{2_{iso}} - T_{v_N})}{\eta_{compressor}}$$

Then $\Delta \dot{m}_{manifold} = \dot{m}_{v_N} c_{P_{steam}} \frac{(T_{2_{real}} - T_{sat_{PEOR}})}{(h_{g_{PEOR}} - h_{manifold})}$ $c_{psteam} = 0.445$ Btu/lbm*R And $$\dot{W}_{compressor} = (\dot{m}_{v_N} + \Delta \dot{m}_{manifold}) P_{v_N} v_{v_N} \frac{k}{k-1} \left[\left(\frac{P_{EOR}}{P_{v_N}}\right)^{\frac{k-1}{k}} - 1\right]$$

$$= \text{"Pwr-COMP"}$$

The remaining heat (gas) "QBURN" that is not required to generate auxiliary power ("Lift Pwr") or MED end-effect vapor compression power can be routed for additional heating of the TEOR fluid in the boiler. If more power is required for vapor compression than is available from the gas in the combined-cycle, a portion of the MED end-effect steam "BVNB" is bypassed to a separate condenser in the SEP for condensing. Compare the TEOR mass rate for the "X-best" value of 0.40, i.e., "WBEST"=29.8 lbm/s, as compared to 20.7 lbm/s for Mode 1; the vapor compression recovery of the end-effect steam, versus being used for saturated brine reduction to solid salt, results in 44% more heat available for TEOR. This increased performance will help offset the cost of the added equipment, as well as offset the cost for solar pond instantiation, akin to a "disposal" cost to properly dispose of the saturated salt brine by-product. For comparison in the modeling results below, if all the MED distillate was injected for TEOR, the mass rate would be "WEOR" at conditions "TEOR", "HEOR", and "XEOR" (versus "WBEST" at "X-best"). The following example output are for baseline conditions.

| | |
|---|---|
| [1] eta-burner = .900 | [2] eta-Brayton = .320 |
| [3] eta-comp = .700 | [4] eta-turb = .750 |
| [5] EGT (F) = 1000. | [6] PEOR (psia) = 200. |
| [7] Lift Pwr (kW) = 0. | [8] eta-pumps = .850 |
| [9] Ptur-in (psi) = 2000. | [10] Ptur-out (psi) = 1.0 |
| [13] Tur-Stm-T (F) = 800. | [14] X-best = .400 |
| Pwr-BRAY (kW) = 3675. | Pwr-RANK (kW) = 1626. |
| RANK-stm (pps) = 5.27 | RANK-pump (kW) = 46.9 |
| Pwr-COMP (kW) = 4564. | BVN (pps) = 8.86 |
| DELM (pps) = 5.040 | BVNB (pps) = .000 |
| PUMP-pwr (kW) = 33.3 | WBEST (pps) = 29.8 |
| HEOR (BTU/lbm) = 436.0 | WEOR (pps) = 59.9 |
| TEOR (F) = 381.9 | XEOR = .095 |
| QAVAIL (BTU/S) = 12185. | QRANKINE (BTU/S) = 7457. |
| QBURN (BTU/S) = 1298. | X-RANKINE TURBINE = .938 |

A cross-check on the power for vapor compression is made by comparing the power required for typical adiabatic compression with that as calculated for evaporatively cooled, viz:

$$\dot{W}_{adiabatic-compression} = \frac{\dot{m}_{v_N} P_{v_N} v_{v_N}}{\eta_{compressor}} \frac{n}{n-1} \left[\left(\frac{P_{EOR}}{P_{v_N}}\right)^{\frac{n-1}{n}} - 1\right]$$

$$= 5863 \text{ kW}$$

This value compares with the evaporatively cooled power "Pwr-COMP" of 4563 kW in the example results above, which is 22% less than adiabatic. Similar efficiency enhancements are noted in the literature for inner-evaporative cooling (Qui, et al; 2004). The combined cycle efficiency in the example output is ~46% (net-pwr/gross/heat), much less than the proposed 60% cycle efficiency cited in the vendor data. However no regenerative efficiencies were estimated in this scoping analysis, which are proprietary features of the vendor systems. With that added efficiency, Mode 3 performance would yield substantial auxiliary power (i.e., "Lift Pwr" in the example results above).

2.3.4. FCS Mode 4

The FCS Mode 4 configuration is shown in FIG. 1. Mode 4 is similar to Mode 3 with the Rankine cycle removed, resulting in a simple Brayton cycle power generation system, as shown in FIG. 1. The heat rejected from the Brayton cycle turbine exhaust is passed to a heat exchanger for recovery in the TEOR fluid, i.e., "QHEAT"=7457 BTU/s in the example results below. Mode 4 employs a zero-discharge SEP which is sized for the heat load of the bypassed end-effect steam condensation, "BVNB"; there is less flow to the SEP for condensing process steam than for Mode 3, which condensed any bypassed steam plus the Rankine cycle working fluid (steam). All the gas is used to fire the gas turbine in the example, which is not sufficient to fully compress the end-effect steam, i.e., "BVNB"=0.875 lbm/s. From a comparison of "WBEST" (at "X-best=0.4"), Mode 4 is more efficient for TEOR than Mode 3, i.e., 39.2 pps for Mode 4 versus 29.8 pps for Mode 3, whereas Mode 3 is better for producing auxiliary power.

| | |
|---|---|
| [1] eta-burner = .900 | [2] eta-Brayton = .320 |
| [3] eta-comp = .700 | [4] eta-turb = .750 |
| [5] EGT (F) = 1000. | [6] PEOR (psia) = 200. |
| [7] Lift Pwr (kW) = 0. | [8] eta-pumps = .850 |
| [9] T-recirc (F) = 100. | [10] X-best = .400 |
| Pwr-BRAY (kW) = 4113. | Pwr-COMP (kW) = 4113. |
| BVN (pps) = 7.99 | DELM (pps) = 4.542 |
| BVNB (pps) = .875 | PUMP-pwr (kW) = 34.3 |
| HEOR (BTU/lbm) = 514.5 | WEOR (pps) = 59.9 |
| TEOR (F) = 381.9 | XEOR = .188 |
| QAVAIL (BTU/S) = 12185. | QHEAT (BTU/S) = 7457. |
| QBURN (BTU/S) = 0. | WBEST (pps) = 39.2 |

Modeling results for Mode 4 performance, like those given for Mode 1 in Table II and FIG. 6, are provided in Table III and FIG. 9. Note that projected solar pond performance is also provided in the table, as an objective for Mode 4 is to construct solar ponds for renewable energy production. For this example, the renewably produced power is used to drive coastal reverse osmosis desalination (ROD) of seawater for production of potable water. The ROD performance in the table (7500 acre-feet/yr) assumes a five year GPGT production life.

2.3.5. FCS Mode 5

The FCS Mode 5 configuration is shown in FIG. 10. Mode 5 condenses the MED end-effect using the zero-discharge fresh water SEP directly (i.e., similar to a cooling tower), and uses all the gas to fire a boiler to heat the TEOR fluid directly. The potential for including gas injection EOR is indicated in the figure with dashed lines, as in the previous modes. Likewise the option of recirculating the EOR fluid is facilitated by "ganged" operation of the "H2O Distillate" flow from the MED manifold and the "Irrigation Water" flow from the SEP feed line. This is a very simple mode, with respect to turbomachinery, for TEOR and building solar ponds. The TEOR effectiveness can be compared directly using the Mode 5 value of 20.9 lbm/s for "WBEST", i.e., at TEOR steam quality "X-best"=0.40, which is essentially equivalent to the "WBEST" value of 20.7 lbm/s for Mode 1, as would be expected. Mode 5 can also be operated to recirculate the EOR fluid (in sensitive areas) as noted for Modes 2 through 4.

2.3.6. FCS Mode 6

The FCS Mode 6 configuration is shown in FIG. 11. Mode 6 is used for GPGT recovery and conversion to solar ponds without the collocation of an oil reservoir requiring TEOR. In this mode the gas and H2O distillate are recovered for sale, with the saturated brine routed for solar pond construction. To facilitate condensation of the end-effect steam without the need for an out-of-system heat-sink, less-than-saturated MED end-effect brine is routed first to a SEP; for this mode, the salt concentration of the MED discharge brine is less than saturated (~60% saturated for baseline conditions), and the final concentration to saturation is accomplished by the SEP. The heat and mass transfer of the SEP concentration enables the cooling for the end-effect steam condensation. For estimation purposes, the MED end-brine mass rate into the SEP should be equal to or greater than the saturated mass rate plus the end-effect vapor rate, where:

$$\dot{m}_{b_{N-sat}} = \frac{S_o}{S_{sat}} \dot{m}_{b_o} \text{ then } \dot{m}_{b_{N-MODE6}} \geq \frac{S_o}{S_{sat}} \dot{m}_{b_o} + \dot{m}_{v_N}$$

As a practical matter, a greater amount will need to be flowed to the SEP for evaporation than the condensed steam to account for some conventional evaporative SEP performance; SEP evaporation inefficiency is desired in this case, as it is intended to serve primarily as a cooling pond versus a reduction pond. Also, the produced H2O distillate will be less than that for the other modes by the amount of evaporation in the SEP (45 pps v. 60 pps for baseline conditions, i.e., roughly 75% of the previously recovered H2O distillate, and the rest boiled off in the SEP).

2.3.7. FCS Mode 7

The FCS Mode 7 configuration is shown in FIG. 12. Mode 7 serves the same functionality as Mode 6 for the operational scenario of producing solid salt for sale, in addition to the water and gas. As indicated for Modes 1 and 2, a portion of the manifold water is flashed to the condenser to promote SEP evaporation.

2.3.8. Additional FCS Notes

Table IV compares the TEOR FCS Modes with respect to the objective of providing heat for TEOR, measured by "WBEST". The seven modes noted are intended as a set of tactical modules with which to profitably convert the GPGT resource into a renewable energy resource, i.e., solar ponds, while increasing the near-term availability of heavy oil resources. For that construct, then, any one of the modules could operate individually, or as a group of same-type modules, or as an integrated group of different-type modules. The main point to be made is that the systems can be implemented in an extensible modular fashion, with conformable configurations best suited for the conditions at hand to achieve the main objectives of heavy oil recovery and instantiation of renewable energy systems. Cost benefit analysis as developed in the author's published dissertation (Nitschke, 2006) demonstrates that the oil operator's costs for heavy oil recovery can be cut from one-half to one-fourth, while installing the solar pond renewable energy systems as a byproduct of the oil recovery operation. Further operational benefits of the TEOR FCS proposed herein include: in-system production of distilled water to supply/re-supply the steamflood; in-system production of the requisite thermal energy and gas for the TEOR; and the ability to distribute the steam injection operation over a wider area, versus point-source injection typical of co-generation steamflood operations.

In those limited cases where a suitable end-use for the produced salt is not available, the MED end-effect brine could be disposed in a suitable subterranean reservoir, including a region of the GPGT reservoir under production. While the installation of a MED-brine disposal well was not directly indicated on any of the figures, it should be clear that such a disposal well could be utilized with any of the FCS modes, i.e., in lieu of solid salt production or solar pond construction, etc.

A note is made regarding FCS Mode 3. An alteration to Mode 3 as shown in FIG. 8 is also considered (Mode 8), where the feedstock for the Rankine turbine is provided by the MED Manifold and the end-steam is then discharged to the TEOR fluid versus being condensed and reused as a working fluid in closed-loop fashion: this reduces the Rankine full-power by 45% (1018 kW v. 1849 kW for baseline analysis) while only increasing the $X_{best}$ flow by 10%. Since the main role of Mode 3 is high-power, the reduced power capacity for the relatively small increase in heat would not seem to be a better candidate than Mode 4 with respect to TEOR efficiency. Also, the higher discharge turbine pressure would likely severely impact the vendors' $\eta_{th}$=60% combined-cycle target efficiency. Hence the additional Mode 8 is not otherwise discussed herein, but the alternate operation is evident from an inspection of FIG. 8, and its configuration and operation are included with this disclosure.

For all the FCS configurations, which consume gas for on-site use, the gas is shown in the figures as produced with the GPGT brine. However, where the case would warrant, the gas from an out-of-system source could supply or augment the site-use requirements.

Heating the recirculated TEOR fluid via heat exchange with MED manifold distillate, as shown for Mode 2 in FIG. 7, could be a feature of all the modes where recirculation is an option (i.e., modes 2, 3, 4, 5, 8). That option, which functional applicability is evident by inspection of FIG. 7 in context with the other figures, was omitted from the other figures for simplicity of depiction.

An option to using the zero-discharge SEP for in-system cooling requirements (e.g., condensing Rankine working fluid of Mode 3) would be to use an out-of-system heat sink (e.g., simple heat exchange with local rivers, etc.).

Finally, while the use of a Brayton-cycle (Mode 4) or Brayton-Rankine combined cycle (Mode 3) are considered preferred power-plant embodiments for the main TEOR modes, the use of other heat engines (e.g., Air-Otto cycle, Stirling cycle, etc.) for this role is foreseeable. For instance, an internal combustion reciprocating engine could also be used to provide the requisite shaft power for the vapor compressor, while also adding waste heat for TEOR (e.g., exhaust gas heat recovery, similar to the heat recovery of the Brayton-cycle exhaust gas). This alternate embodiment is included with this disclosure.

2.3.9. FCS TEOR Performance

The invention disclosed herein deals with the method for providing the EOR injection fluid (e.g., TEOR steamflood), therefore the specific practice of TEOR (e.g., optimum steam injection states, injection/producer ratio and patterns, etc.) is considered to be an established practice. Per typical practice, as depicted in FIG. 1, TEOR steamflood is routed to an injection well(s) to promote recovery of the heavy oil via floodbank flow to a producer well(s). The TEOR mechanisms are understood in the industry (e.g., viscosity reduction, thermal expansion, steam distillation, miscible and emulsion drive, solution gas drive), and site-specific factors (e.g.: oil viscosity; formation permeability, porosity and structure) generally dictate operational considerations like the number and pattern of injectors and producers. However some remarks regarding performance projections for the TEOR FCS are added here for clarity.

Gomaa's method was used to approximate the FCS TEOR steamflood performance. The details of that analysis can be found in the author's published dissertation (Nitschke, 2006). Gomaa's method was developed by conducting sensitivity analyses on key TEOR variables using a simulator that was correlated to historical performance of a steamflood project in the Kern River Field in California. Since that region is proposed as highly suitable for the GPGT-TEOR systems discussed in this disclosure, Gomaa's method is considered sound for estimating the TEOR performance of the FCS. Using Gomaa's method, steam-oil-ratios (SOR) of approximately SOR=5.2 were projected for a five-year project life and SOR=7.0 for a seven-year project life (SOR is the bbls of steam injected, cold water equivalent, per bbl of oil recovered). The five and seven year project lives are consistent with the Kern River area and Gomaa's method (Chu, 1990). It should be noted that using a constant SOR over a project life is a generalization with respect to actual TEOR operations, as the oil production profile over the project life more resembles a skewed bell-curve that peaks when the steam is nearing breakthrough, and the SOR metric is actually a cumulative average. Nevertheless SOR serves as the measure of choice to compare steamflood TEOR performance. In Gomaa's analysis, corresponding to the Kern River area, a steam quality of x=0.4 and injection pressure of 200 psia is considered optimal for TEOR. The performance estimates, for baseline GPGT conditions, of the five FCS TEOR Modes using Gomaa's method (Nitschke, 2006), where "bpd" indicates the average oil recovery over the project life in bbls per day and the injected steamflood mass rate corresponds to the FCS Mode performance at x=0.4, 200 psia, are summarized in Table V.

A check on the performance projections from the Gomaa's analysis in Table V can be made by comparing SOR as reported from field operations, e.g., in the Kern River region. The literature reports SOR for California TEOR fields ranging from 2.47 to 8.43, with a weighted average of SOR=3.68 (EPRI, 1999). The SOR predicted by Gomaa's method is conservative with respect to these data. Other accounts indicate SOR=2.25 for steam states of x=0.65 and 600 psia (private communication from major operator in Kern County, Calif.). The FCS Modes 1 and 4 were evaluated for this specific TEOR design point (steamflood condition), for GPGT parameters representative of the California GPGT reservoirs (GeothermEx, 1993), and compared to the estimates from Gomaa's method; the results are shown in Table VI. As shown in Table VI, the field-reported SOR for the design-point conditions would yield from 28% to 41% higher FCS TEOR performance than the estimates from Gomaa's method. This conservatism is comparable to that seen with the EPRI data (i.e., EPRI average SOR=3.68 compared to five-year Gomaa SOR=5.2), although specific TEOR design point conditions were not reported with those data. Hence the estimated TEOR performance of the FCS invention stated herein (e.g., bpd values in Tables II, III, and V), and likewise reported in the author's published doctoral dissertation, which analyses underlie the technical validity of the present specification, are considered conservative.

2.4. Other Miscellaneous Systems

For the FCS Modes that produce solid salt for sale, the saturated brine exiting the MED can be passed to a clarifier (not pictured in FIG. 1) for the removal of undesirable salts, e.g., BaCl2, CaCl2, and MgCl2. The clarifier specifications will be site and market specific, i.e., the GPGT source brine composition and the salt market purity demands will dictate the type and amount of solids to be removed. Some GPGT source brines might not require clarification if the dissolved solids are acceptable for market. Typical clarifiers discard approximately 5% of the through-flow volume as blowdown (per discussions with vendors). Where the bottoms cannot themselves be marketed, (site and market specific) the blowdown can be diluted and discarded in a disposal well or a zero-discharge SEP. Where the bottoms can be marketed, the blowdown can be processed for surplus chemicals, requiring off-the-shelf systems involving, e.g., transfer pumps, on site tank storage, filter pressing equipment, etc.

The recovered TEOR fluid is routed to the oil separator as shown in FIG. 1 (off-the-shelf). The oil separator, which operates at near-atmospheric pressure, functions as a baffled tank allowing the gas, oil, and water to separate via gravity. Any suspended solids will be settled and withdrawn for disposal either with a portion of the spent TEOR water to a zero-discharge SEP, recirculated with the TEOR fluid, or in a disposal well. In addition to thermal performance considerations for TEOR, the portion of the TEOR water that is recirculated will depend on the amount of dissolved solids the TEOR water leaches from the oil formation. It is anticipated that pure TEOR injection water will have better recovery efficiency. Hence maintaining the TEOR water's purity will likely be a desired feature, both for TEOR efficiency and for maintenance of surface systems.

The disposal well is perforated across a suitable aquifer for disposing the various unwanted fluids; this could even include a suitable zone/region within the GPGT reservoir under production. These disposal fluids could include the clarifier blowdown, the oil separator blowdown, clean-up GPGT well flow, and general site discard fluid. Additionally, the disposal well could be used for disposing of the MED exit brine, for limited applications as discussed above. The disposal well is equipped with a pump where over pressuring the disposal aquifer is required. For regular pressured aquifers at modest disposal rates, however, minimal pumping may be required as the disposal fluids will generally have a sufficiently high specific gravity to affect the necessary over pressure, e.g., the saturated MED exit brine. Dependent on the size and quantity of suspended solids, a filter may be required upstream of the disposal well pump to prevent plugging of the disposal aquifer. Where site-specific sensitivities to fluid disposal prohibit use of a disposal well, the fluids may potentially be disposed in a zero-discharge SEP, thus reducing the solids, and/or recirculated for disposal to the heavy oil reservoir, either during production or post-production (e.g., reconstituted solids from the zero-discharge SEP).

Given the 600 kW baseline power produced by the turbine-generator (see Tables II, III) and allowing ~50 kW for various site power usage (e.g., controls, site trailer) there remains ~550 kW main site consumption: for solid salt operations (conveyance, processing, etc.), TEOR fluid lift (~20 kW per producer, e.g., based on EPRI data, 1999), pump power to move saturated brine to solar ponds, etc. Any surplus electricity can be sold to the local grid.

Certain system components will be equipped with vendor supplied controls, tailored for that particular component's individual operation. These components include the Pelton Turbine and coupled generator, the MED, FCS TEOR power cycles, oil separator, various pumps, etc. Some of the individual component controls will need to be synthesized and integrated into an overall GPGT-SEP-FCS system control schema.

INDUSTRIAL APPLICABILITY

The present invention provides a range of modularly extensible systems configurations to efficiently utilize the GPGT resource to facilitate TEOR. The methods proposed herein will reduce TEOR costs by one-half to one-fourth of conventional TEOR costs, thereby increasing the availability of domestic oil reserves while reducing U.S. reliance on foreign oil. Utilizing the GPGT resource, as proposed herein, helps mitigate typical TEOR logistics problems of a clean water source and gas supply. Additionally, the TEOR method of this invention holds the potential for increased efficiency (thermal soak, sweep efficiency) due to its distributed nature, versus centralized steamflooding per conventional co-generation operations. Likewise the steam produced by the invention's systems could be utilized by other similar steam consumptive industries. Further the methods proposed herein provide for efficient management of the concentrated GPGT end-brine, including the use as bulk material for the construction of solar ponds to promote the large-scale, renewable production of solar-thermal electricity.

What is claimed is:

1. A method for interfacing with a Geopressured-Geothermal (GPGT) conversion system, wherein said GPGT system separates gas and concentrates GPGT brine via distillation, said method comprising the steps of:

a. flowing a portion of the gas separated from the GPGT conversion system, and/or other-source gas, to fire a Brayton-cycle power plant for the generation of shaft power to drive a vapor compressor to compress a quantity of low-pressure steam from a GPGT distillation process to be used for Thermal Enhanced Oil Recovery (TEOR);

b. combining the compressed steam from step 16.a with a portion of the distilled water from the GPGT conversion system;

c. heating further the TEOR fluid of step 16.b with a quantity of rejected heat from the Brayton-cycle power plant;

d. heating further the TEOR fluid of step 16.c with any remaining gas; and, e. injecting the TEOR fluid of step 16.d to a suitable reservoir to promote TEOR thus achieving a fluid conditioning system (FCS) TEOR Mode 4, wherein the FCS TEOR Mode 4 comprises:

a GPGT well;

a surge tank, wherein the surge tank is disposed to receive a quantity of unprocessed brine from the GPGT well and to separate the gaseous and liquid phases of the brine;

a pelton turbine, wherein the pelton turbine is disposed to receive a quantity of exit brine from the surge tank and to remove a quantity of gas from the brine;

a pre-heater, wherein the pre-heater is disposed to receive a quantity of degassed brine from the pelton turbine and to elevate the temperature of the degassed brine;

a multi-effect distillation system (MED), wherein the MED is disposed to receive a quantity of the brine from the pre-heater and to concentrate the brine to near saturation;

a system condenser, wherein the system condenser is disposed to receive a quantity of low-pressure end-effect steam from the MED and to condense the quantity of end-effect steam through heat exchange;

a spray evaporation pond (SEP), wherein the SEP is disposed to provide heat exchange to a quantity of cooling water supplied by a quantity of the Thermal Enhanced Oil Recovery (TEOR) return fluid;

a Brayton cycle, wherein the Brayton cycle is disposed to receive the gas separated from the brine to power the cycle;

a vapor compressor, wherein the vapor compressor is disposed to receive the remaining end-effect steam from the MED and to compress the steam for use in TEOR collocated oil;

an oil/gas/water separator, wherein the separator is disposed to receive a quantity of TEOR return fluid and to separate the quantity of return fluid into a quantity of oil, gas and water; and a heat exchanger, wherein the heat exchanger is disposed to receive a quantity of heat rejected from the Brayton cycle and to produce additional steam for TEOR.

2. The method for interfacing with a GPGT conversion system, wherein said GPGT system separates gas and concentrates GPGT brine via distillation, of claim 1 further comprising the step of:

f. flowing distilled water from the GPGT conversion system to affect inner-cooling of the vapor compressor to increase compression efficiency and Thermal Enhanced Oil Recovery (TEOR) steamflood.

3. The method for interfacing with a GPGT conversion system, wherein said GPGT system separates gas and concentrates GPGT brine via distillation, of claim 1, wherein FCS TEOR Mode 4 further comprises an auxiliary generator, and further comprising the step of:

f. powering the auxiliary generator with a portion of the shaft power from step 16.a for the production of electricity.

4. The method for interfacing with a GPGT conversion system, wherein said GPGT system separates gas and concentrates GPGT brine via distillation, of claim 1 further comprising the step of:

f. bypassing a portion of the low-pressure steam from the GPGT distillation process to the condenser, for recovery of the bypassed water via a pumping mechanism, the condenser which exchanges heat to a zero-discharge spray evaporation pond (SEP) supplied with cooling water by a portion of the returned Thermal Enhanced Oil Recovery (TEOR) fluid, or other out-of-system heat sink.

5. The method for interfacing with a GPGT conversion system, wherein said GPGT system separates gas and concentrates GPGT brine via distillation, of claim 1 further comprising the steps of:

f. flowing a portion of the separated GPGT gas, and/or other-source gas, from the GPGT conversion system to the Thermal Enhanced Oil Recovery (TEOR) injection fluid for injection into an oil reservoir to promote enhanced oil recovery (EOR); and, g. recovering the gas from the oil reservoir at the gas-water-oil separator and using the gas to produce steam for TEOR.

6. The method for interfacing with a GPGT conversion system, wherein said GPGT system separates gas and concentrates GPGT brine via distillation, of claim 1, wherein FCS TEOR Mode 4 further comprises a recirculating pump, and further comprising the step of:

f. recirculating the Thermal Enhanced Oil Recovery (TEOR) water recovered from a gas-water-oil separator with the recirculating pump and combining with the Thermal Enhanced Oil Recovery (TEOR) steamflood for reheat and reuse as TEOR fluid.

7. The method for interfacing with a GPGT conversion system, wherein said GPGT system separates gas and concentrates GPGT brine via distillation, of claim 1, wherein the FCS TEOR Mode 4 further comprises a disposal well and pump for bottoms, and further comprising the step of:

f. disposing the bottoms from a gas-water-oil separator to a suitable subterranean formation with the disposal well and pump.

8. The method for interfacing with a GPGT conversion system, wherein said GPGT system separates gas and concentrates GPGT brine via distillation, of claim 1, wherein the FCS TEOR Mode 4 further comprises a disposal well, and further comprising the step of:

f. disposing the concentrated brine from the GPGT conversion system to a suitable subterranean formation with a disposal well and pump for the brine.

9. A method for interfacing with a Geopressured-Geothermal (GPGT) conversion system, wherein said GPGT system separates a quantity of gas and concentrates GPGT brine via distillation, said method comprising the steps of:

a. flowing a portion of the gas separated from the GPGT conversion system, and/or other-source gas, to fire an internal combustion reciprocating engine for the generation of shaft power to drive a vapor compressor to compress a quantity of low-pressure steam from a GPGT distillation process to be used for Thermal Enhanced Oil Recovery (TEOR);

b. combining the compressed steam from step 49.a with a portion of the distilled water from the GPGT conversion system;

c. heating the TEOR fluid of step 49.b further with a quantity of reject heat from said internal combustion reciprocating engine;

d. heating further the TEOR fluid of step 49.c with a quantity of rejected heat from the internal combustion reciprocating engine;

e. heating further the TEOR fluid of step 49.d with a quantity of remaining gas; and, f. injecting the TEOR fluid of step 49.e suitable reservoir to promote TEOR thus achieving a fluid conditioning system (FCS) TEOR Mode 4, wherein FCS TEOR Mode 4 comprises:

a GPGT well;

a surge tank, wherein the surge tank is disposed to receive a quantity of unprocessed brine from the GPGT well and to separate the gaseous and liquid phases of the brine;

a pelton turbine, wherein the pelton turbine is disposed to receive a quantity of exit brine from the surge tank and to remove a quantity of gas from the brine;

a pre-heater, wherein the pre-heater is disposed to receive a quantity of degassed brine from the pelton turbine and to elevate the temperature of the degassed brine;

a multi-effect distillation system (MED), wherein the MED is disposed to receive a quantity of the brine from the pre-heater and to concentrate the brine to near saturation;

a system condenser, wherein the system condenser is disposed to receive a quantity of low-pressure end-effect steam from the MED and condense the quantity of end-effect steam through heat exchange;

a spray evaporation pond (SEP), wherein the SEP is disposed to provide heat exchange to a quantity of cooling water supplied by a quantity of the Thermal Enhanced Oil Recovery (TEOR) return fluid;

an internal combustion reciprocating engine, wherein the reciprocating engine is disposed to receive the gas separated from the brine to power the engine;

a vapor compressor, wherein the vapor compressor is disposed to receive the remaining end-effect steam from the MED and to compress the steam for use in TEOR collocated oil;

an oil/gas/water separator, wherein the separator is disposed to receive a quantity of TEOR return fluid and to separate the quantity of return fluid into a quantity of oil, gas and water; and a heat exchanger, wherein the heat exchanger is disposed to receive a quantity of heat rejected from the reciprocating engine and to produce additional steam for TEOR.

* * * * *